(12) United States Patent
Bacastow

(10) Patent No.: US 11,880,437 B2
(45) Date of Patent: *Jan. 23, 2024

(54) METHOD AND SYSTEM FOR REMOTE DATA ACCESS

(71) Applicant: QuickVault, Inc., Cumming, GA (US)

(72) Inventor: Steven V. Bacastow, Cumming, GA (US)

(73) Assignee: QUICKVAULT, INC., Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,522

(22) Filed: Dec. 5, 2022

(65) Prior Publication Data

US 2023/0097735 A1 Mar. 30, 2023

Related U.S. Application Data

(63) Continuation of application No. 17/836,587, filed on Jun. 9, 2022, now Pat. No. 11,568,029, which is a
(Continued)

(51) Int. Cl.
*G06F 21/30* (2013.01)
*G06F 11/14* (2006.01)
(Continued)

(52) U.S. Cl.
CPC ........ *G06F 21/305* (2013.01); *G06F 11/1458* (2013.01); *G06F 21/121* (2013.01);
(Continued)

(58) Field of Classification Search
CPC ....... G06F 21/30–36; G06F 21/12–128; G06F 21/60–645; G06F 21/78; G06F 11/1458; H04L 63/04–0492; H04L 63/08–0892; H04L 63/10–108; H04L 63/12–126; H04L 63/20; H04W 12/00–80; H04W 4/80

See application file for complete search history.

(56) References Cited

U.S. PATENT DOCUMENTS 5,331,136 A 7/1994 Koench et al.
5,566,339 A 10/1996 Perholtz et al.
(Continued)

FOREIGN PATENT DOCUMENTS

CN 103700195 A1 2/2014
JP 2004326210 A 11/2004
(Continued)

OTHER PUBLICATIONS

Blaze, Matt. "A cryptographic file system for UNIX." Proceedings of the 1st ACM conference on Computer and communications security. ACM, 1993.
(Continued)

*Primary Examiner* — Madhuri R Herzog
(74) *Attorney, Agent, or Firm* — King & Spalding LLP

(57) ABSTRACT

A system and method for securely storing, retrieving and sharing data using PCs and mobile devices and for controlling and tracking the movement of data to and from a variety of computing and storage devices.

11 Claims, 17 Drawing Sheets

Architecture For Mobile Data Security
(using a Mobile Storage Device)

Related U.S. Application Data continuation of application No. 16/395,636, filed on Apr. 26, 2019, now Pat. No. 11,392,676, which is a continuation of application No. 16/056,525, filed on Aug. 7, 2018, now abandoned, which is a continuation of application No. 15/476,556, filed on Mar. 31, 2017, now Pat. No. 10,045,215, which is a continuation of application No. 14/990,438, filed on Jan. 7, 2016, now Pat. No. 9,614,858, which is a continuation of application No. 14/542,093, filed on Nov. 14, 2014, now Pat. No. 9,264,431, which is a continuation of application No. 14/323,952, filed on Jul. 3, 2014, now Pat. No. 8,918,846, which is a continuation of application No. 13/306,155, filed on Nov. 29, 2011, now Pat. No. 8,812,611, which is a continuation of application No. 12/466,989, filed on May 15, 2009, now Pat. No. 8,086,688.

(60) Provisional application No. 61/130,207, filed on May 29, 2008, provisional application No. 61/130,189, filed on May 29, 2008, provisional application No. 61/130,223, filed on May 29, 2008, provisional application No. 61/130,206, filed on May 29, 2008, provisional application No. 61/127,960, filed on May 16, 2008.

(51) Int. Cl.

| | |
|---|---|
| *G06F 21/60* | (2013.01) |
| *G06F 21/62* | (2013.01) |
| *G06F 21/78* | (2013.01) |
| *H04L 9/40* | (2022.01) |
| *H04W 12/0431* | (2021.01) |
| *G06F 21/12* | (2013.01) |
| *H04W 12/06* | (2021.01) |
| *H04W 12/08* | (2021.01) |
| *H04W 4/80* | (2018.01) |
| *H04L 67/04* | (2022.01) |
| *H04L 67/50* | (2022.01) |

(52) U.S. Cl.
CPC .......... *G06F 21/606* (2013.01); *G06F 21/62* (2013.01); *G06F 21/6218* (2013.01); *G06F 21/6245* (2013.01); *G06F 21/78* (2013.01); *H04L 63/0435* (2013.01); *H04L 63/083* (2013.01); *H04L 63/0876* (2013.01); *H04L 63/10* (2013.01); *H04L 63/102* (2013.01); *H04L 63/107* (2013.01); *H04L 63/12* (2013.01); *H04L 63/20* (2013.01); *H04W 12/0431* (2021.01); *H04W 12/06* (2013.01); *H04W 12/08* (2013.01); *H04L 63/0492* (2013.01); *H04L 67/04* (2013.01); *H04L 67/535* (2022.05); *H04W 4/80* (2018.02)

(56) References Cited

U.S. PATENT DOCUMENTS

| | | | |
|---|---|---|---|
| 5,592,618 A | | 1/1997 | Micka et al. |
| 5,659,595 A | | 8/1997 | Chanu et al. |
| 5,696,909 A | | 12/1997 | Wallner |
| 5,790,074 A | | 8/1998 | Rangedahl et al. |
| 5,844,776 A | | 12/1998 | Yamaguchi et al. |
| 5,956,733 A | | 9/1999 | Nakano et al. |
| 5,979,753 A | | 11/1999 | Roslak |
| 6,003,008 A | | 12/1999 | Postrel et al. |
| 6,062,478 A | | 5/2000 | Izaquirre et al. |
| 6,166,688 A | | 12/2000 | Cromer et al. |
| 6,170,060 B1 | | 1/2001 | Mott et al. |
| 6,442,682 B1 | | 8/2002 | Pothapragada et al. |
| 6,546,441 B1 | | 4/2003 | Lum |
| 6,553,348 B1 | | 4/2003 | Hashimoto |
| 6,574,716 B2 | | 6/2003 | Dovi |
| 6,611,850 B1 | | 8/2003 | Shen |
| 6,614,349 B1 | | 9/2003 | Proctor et al. |
| 6,640,217 B1 | | 10/2003 | Scanlan et al. |
| 6,704,885 B1 | | 3/2004 | Salas-Meza et al. |
| 6,901,511 B1 | | 5/2005 | Otsuka |
| 6,941,454 B1 | | 9/2005 | Spraggs |
| 6,950,949 B1 | | 9/2005 | Gilchrist |
| 7,103,684 B2 | | 9/2006 | Chen et al. |
| 7,143,289 B2 | | 11/2006 | Denning et al. |
| 7,165,154 B2 | | 1/2007 | Coombs et al. |
| 7,225,208 B2 | | 5/2007 | Midgley et al. |
| 7,229,016 B2 | | 6/2007 | Bravo |
| 7,263,190 B1 | | 8/2007 | Moritz |
| 7,269,732 B2 | | 9/2007 | Kilian-Kehr |
| 7,356,510 B2 | | 4/2008 | Durand et al. |
| 7,356,703 B2 | | 4/2008 | Chebolu et al. |
| 7,403,743 B2 | | 7/2008 | Welch |
| 7,404,088 B2 | | 7/2008 | Giobbi |
| 7,406,596 B2 | | 7/2008 | Roumiantsev |
| 7,412,477 B1 | | 8/2008 | Hilbert |
| 7,421,516 B2 | | 9/2008 | Minogue et al. |
| 7,543,053 B2 | | 6/2009 | Goodman |
| 7,561,691 B2 | | 7/2009 | Blight et al. |
| 7,698,392 B2 | | 4/2010 | Zapata |
| 7,702,922 B2 | | 4/2010 | Hetzler |
| 7,707,642 B1 | | 4/2010 | Herbach |
| 7,739,402 B2 | | 6/2010 | Roese et al. |
| 7,818,608 B2 | | 10/2010 | DeMaio et al. |
| 8,041,677 B2 | | 10/2011 | Sumner et al. |
| 8,086,688 B1 | | 12/2011 | Bacastow |
| 8,180,735 B2 | | 5/2012 | Ansari et al. |
| 8,316,102 B2 | | 11/2012 | Matsuzaki et al. |
| 8,745,223 B2 * | | 6/2014 | Hodul .................. H04L 63/101 709/225 |
| 8,862,687 B1 | | 10/2014 | Bacastow |
| 8,868,683 B1 | | 10/2014 | Bacastow |
| 2002/0082925 A1 | | 6/2002 | Herwig |
| 2002/0188856 A1 | | 12/2002 | Worby |
| 2002/0193157 A1 | | 12/2002 | Yamada et al. |
| 2003/0005193 A1 | | 1/2003 | Seroussi et al. |
| 2003/0046034 A1 | | 3/2003 | Kitamoto et al. |
| 2003/0050940 A1 | | 3/2003 | Robinson |
| 2003/0055792 A1 | | 3/2003 | Kinoshita et al. |
| 2003/0074575 A1 | | 4/2003 | Hoberock et al. |
| 2003/0110371 A1 | | 6/2003 | Yang et al. |
| 2003/0135418 A1 | | 7/2003 | Shekhar et al. |
| 2003/0174167 A1 | | 9/2003 | Poo et al. |
| 2003/0225971 A1 | | 12/2003 | Oishi et al. |
| 2003/0233501 A1 | | 12/2003 | Ma et al. |
| 2004/0001088 A1 | | 1/2004 | Stancil et al. |
| 2004/0019742 A1 | | 1/2004 | Wei et al. |
| 2004/0038592 A1 | | 2/2004 | Yang |
| 2004/0039575 A1 | | 2/2004 | Bum |
| 2004/0039851 A1 | | 2/2004 | Tang et al. |
| 2004/0039854 A1 | | 2/2004 | Estakhri et al. |
| 2004/0095382 A1 | | 5/2004 | Fisher et al. |
| 2004/0186998 A1 | | 9/2004 | Kim |
| 2004/0187012 A1 | | 9/2004 | Kohiyama et al. |
| 2005/0010768 A1 | | 1/2005 | Light et al. |
| 2005/0010835 A1 | | 1/2005 | Childs et al. |
| 2005/0081198 A1 | | 4/2005 | Cho et al. |
| 2005/0114672 A1 | | 5/2005 | Duncan |
| 2005/0125513 A1 | | 6/2005 | Lam et al. |
| 2005/0138390 A1 | | 6/2005 | Adams et al. |
| 2005/0144443 A1 | | 6/2005 | Cromer et al. |
| 2005/0149394 A1 | | 7/2005 | Postrel |
| 2005/0149684 A1 | | 7/2005 | Sankaran et al. |
| 2005/0149745 A1 | | 7/2005 | Ishidoshiro |
| 2005/0216466 A1 | | 9/2005 | Miyamoto et al. |
| 2006/0010328 A1 | | 1/2006 | Esaka et al. |
| 2006/0041934 A1 | | 2/2006 | Hetzler |
| 2006/0168574 A1 | | 7/2006 | Giannini |
| 2006/0206720 A1 | | 9/2006 | Harada et al. |
| 2006/0209337 A1 | | 9/2006 | Atobe et al. |
| 2006/0242697 A1 | | 10/2006 | Takemura |
| 2006/0253620 A1 | | 11/2006 | Kang |

(56) References Cited

U.S. PATENT DOCUMENTS

| | | | |
|---|---|---|---|
| 2007/0028304 A1 | 2/2007 | Brennan | |
| 2007/0038681 A1 | 2/2007 | Pierce | |
| 2007/0081508 A1 | 4/2007 | Madhavan et al. | |
| 2007/0118847 A1 | 5/2007 | Sugimoto et al. | |
| 2007/0143529 A1 | 6/2007 | Bacastow | |
| 2007/0214047 A1 | 9/2007 | Antonello et al. | |
| 2007/0245158 A1 | 10/2007 | Giobbi et al. | |
| 2008/0022003 A1 | 1/2008 | Alve | |
| 2008/0082813 A1 | 4/2008 | Chow et al. | |
| 2008/0177755 A1 | 7/2008 | Stern et al. | |
| 2008/0262968 A1* | 10/2008 | Saxena | G06F 21/10 705/51 |
| 2010/0063960 A1 | 3/2010 | Lehto | |
| 2011/0040641 A1 | 2/2011 | Bacastow | |
| 2012/0066759 A1 | 3/2012 | Chen et al. | |
| 2013/0125240 A1 | 5/2013 | Xu | |
| 2014/0325609 A1 | 10/2014 | Bacastow | |

FOREIGN PATENT DOCUMENTS

| | | |
|---|---|---|
| JP | 5039273 B2 | 10/2012 |
| WO | WO 03/009620 | 1/2003 |

OTHER PUBLICATIONS

Iomega Automatic Backup Manual Table of Contents (hereafter "IAB" archived on Dec. 22, 2002 at: http://web.archive.org/web/20021222172018/http://www.iomega.com/support/manuals/ioauto/main.html (linking to 22 pages—hereafter "IAB1" . . . "IAB22").

http://web.archive.org/web/20021030183837/www.iomega.com/support/manuals/ioauto/qs_setup.html (hereafter "IAB1") (archived in 2002).

http://web.archive.org/web/20021223082620/www.iomega.com/support/manuals/ioauto/qs_schedule.html (hereafter "IAB11") (archived in 2002).

http://web.archive.org/web/20021223081144/www.iomega.com/support/manuals/ioauto/qs_cache.html (hereafter "IAB12") (archived in 2002).

http://web.archive.org/web/20021223075646/www.iomega.com/support/manuals/ioauto/qs_nomonitor.html (hereafter "IAB13") (archived in 2002).

http://web.archive.org/web20021223081714/www.iomega.com/support/manuals/ioauto/qs_restore.html (hereafter "IAB15") (archived in 2002).

International Searching Authority, International Search Report and Written Opinion, dated Jan. 14, 2016, Moscow, Russia.

IBM, Securing and protecting the organization's most sensitive data, Oct. 2013.

* cited by examiner

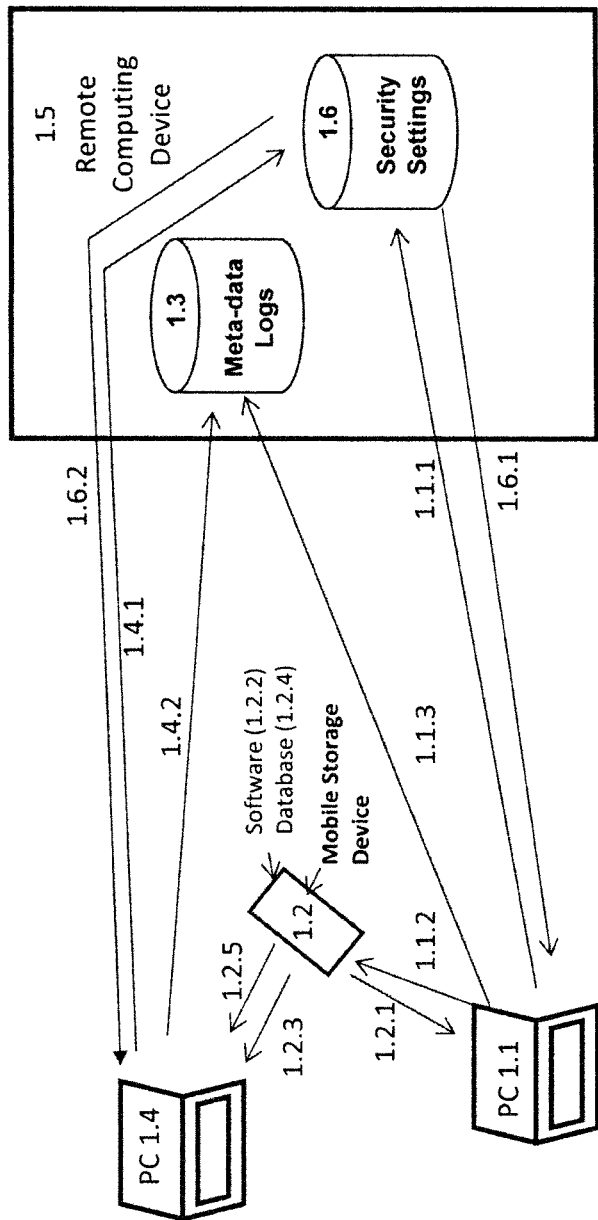
Figure 1 – Architecture For Mobile Data Security (using a Mobile Storage Device)

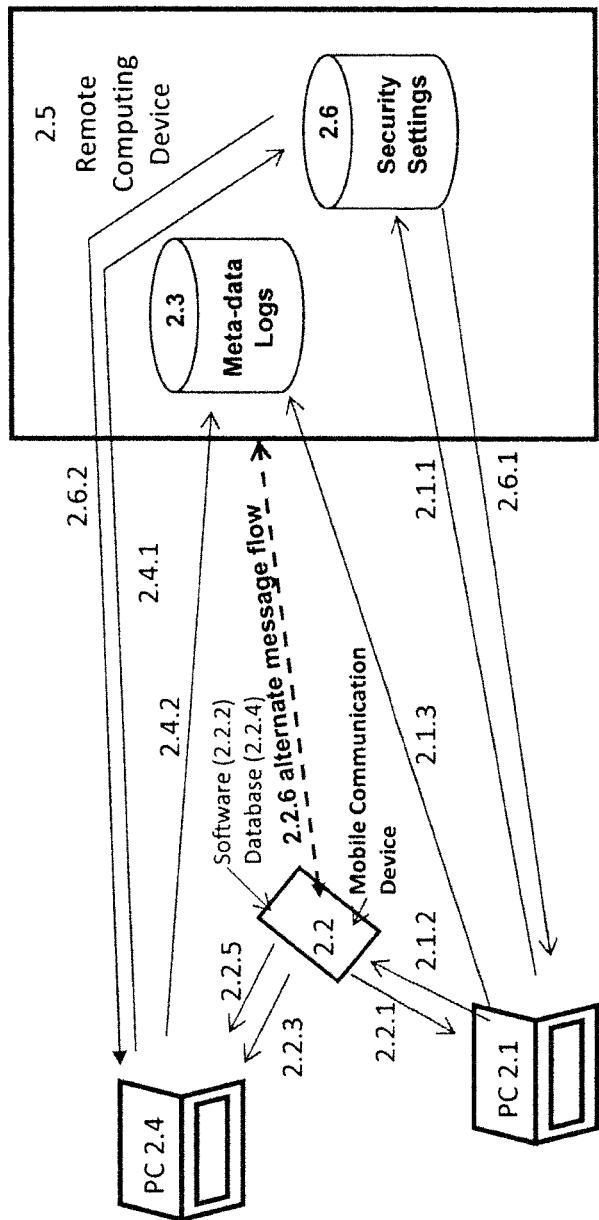

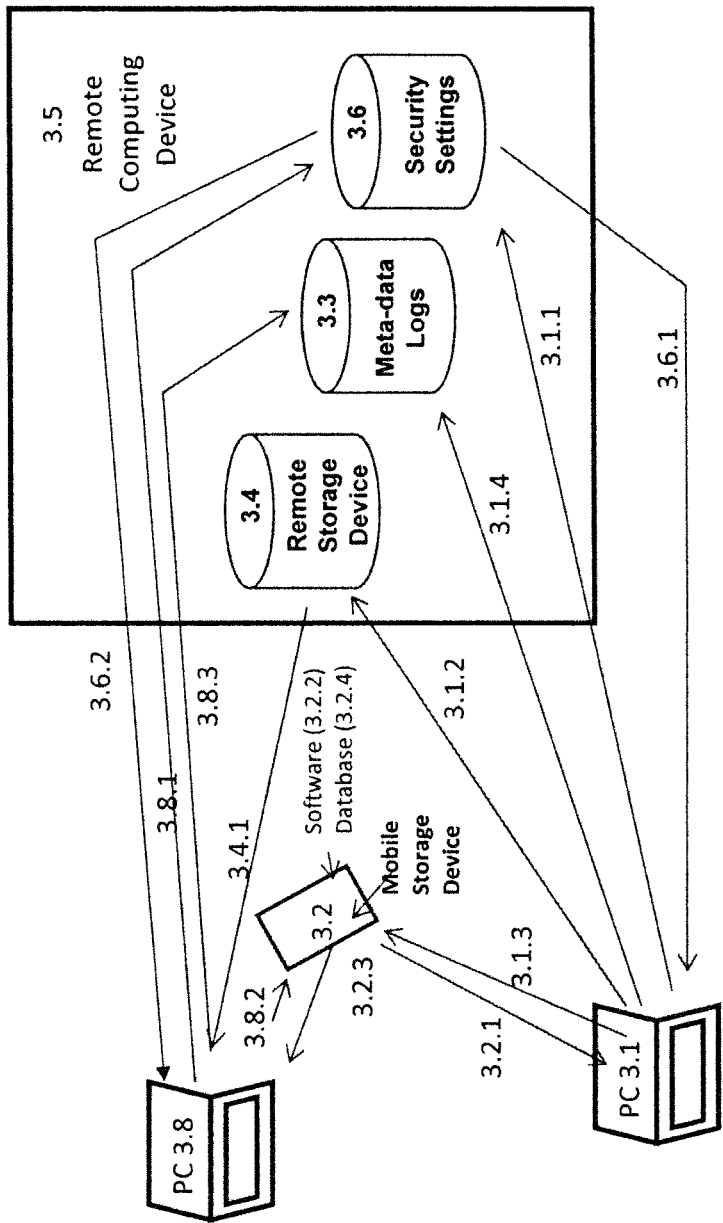
Figure 3 – Architecture For Multi Factor Remote Data Access (using a Mobile Storage Device)

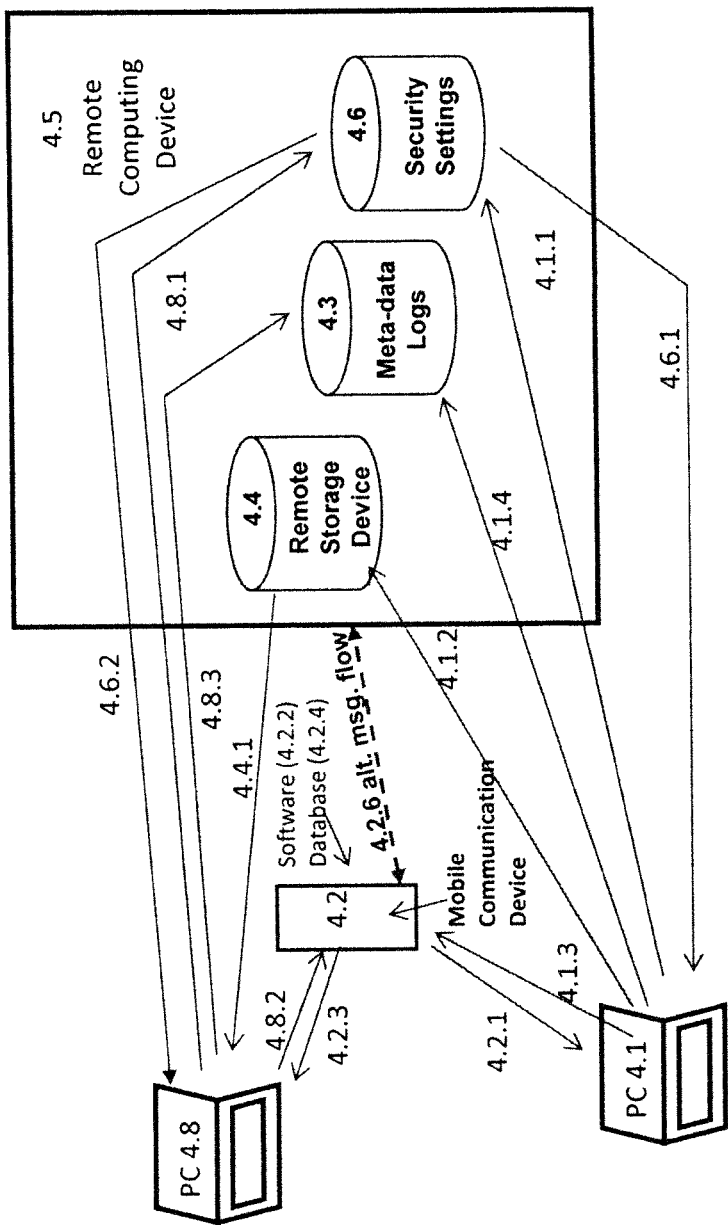
Figure 4 - Architecture For Multi Factor Remote Data Access (using a Mobile Communication Device)

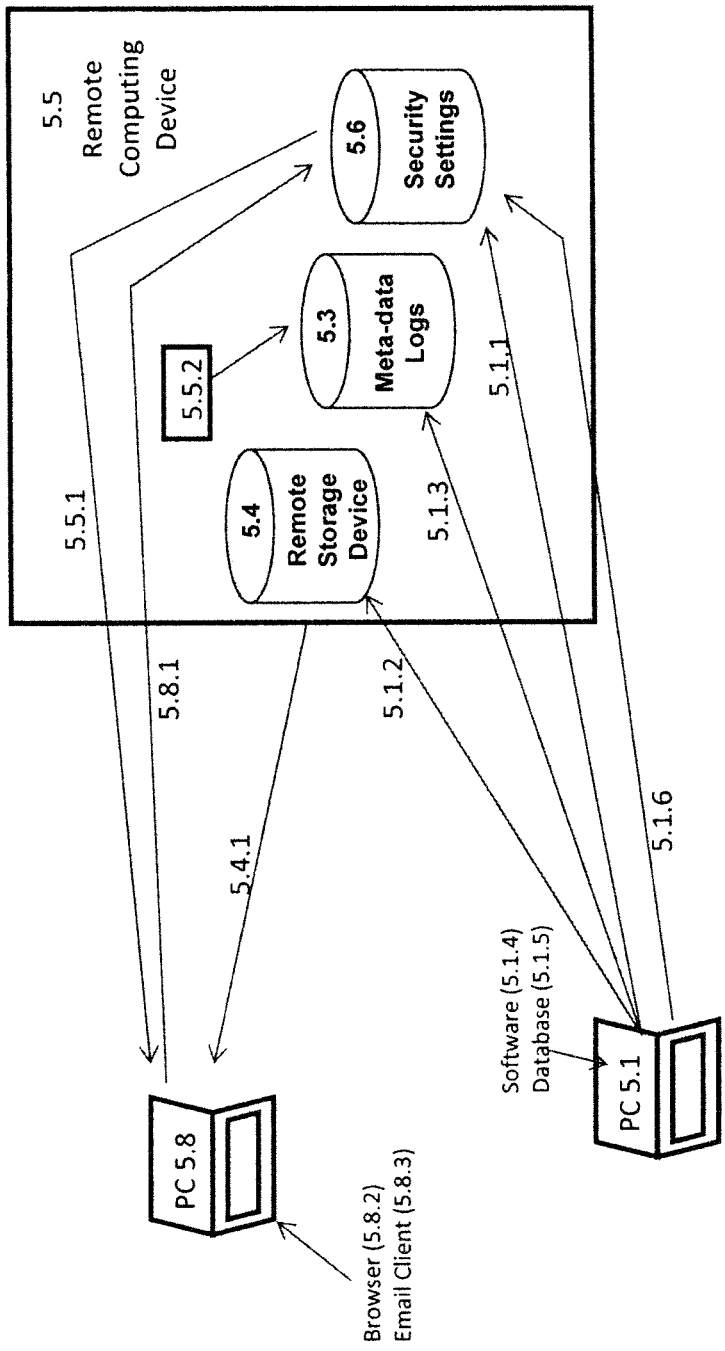
Figure 5 – Architecture For Secure File Sharing (PC to PC)

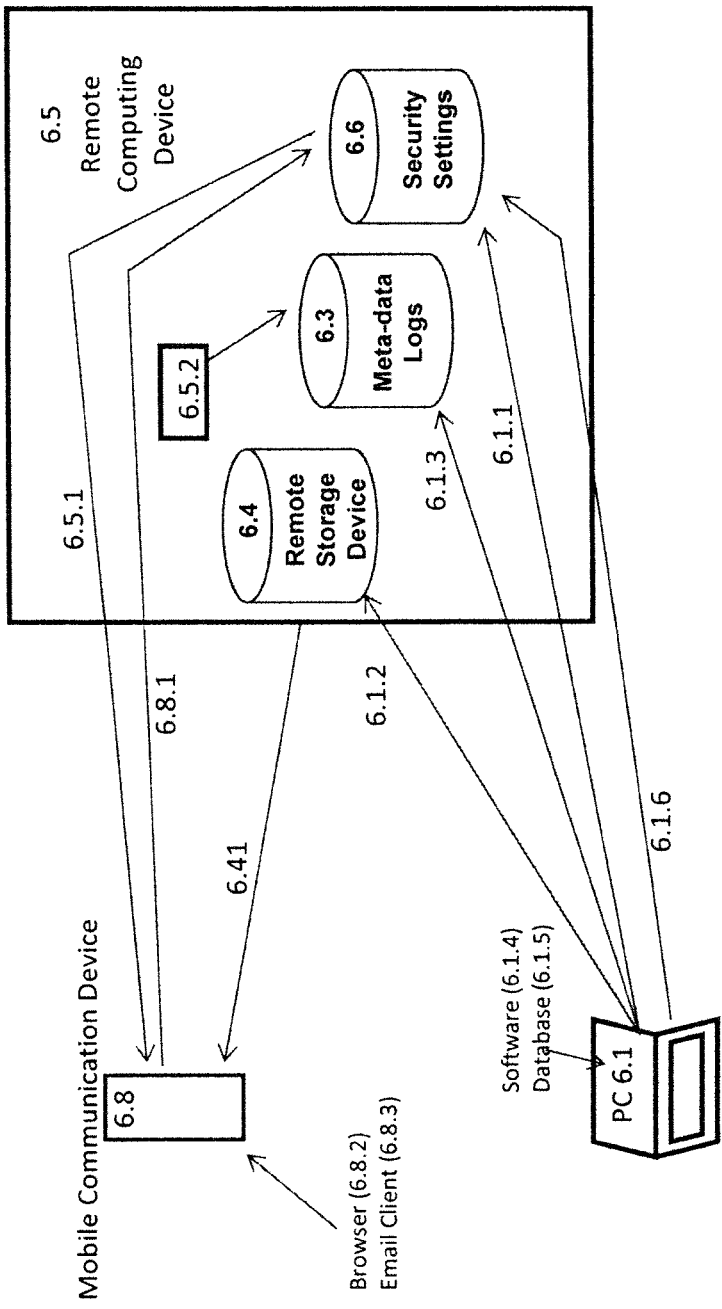
Figure 6 -- Architecture For Secure File Sharing (PC to Mobile Communication Device)

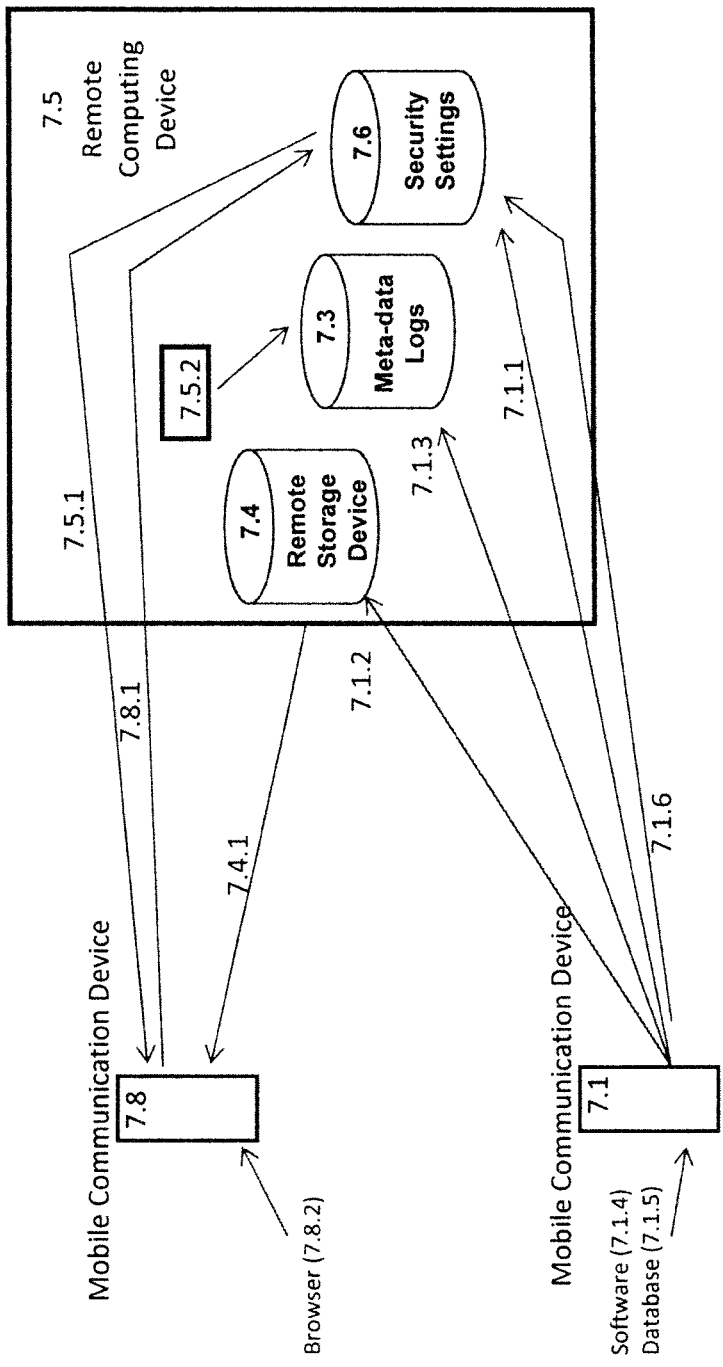

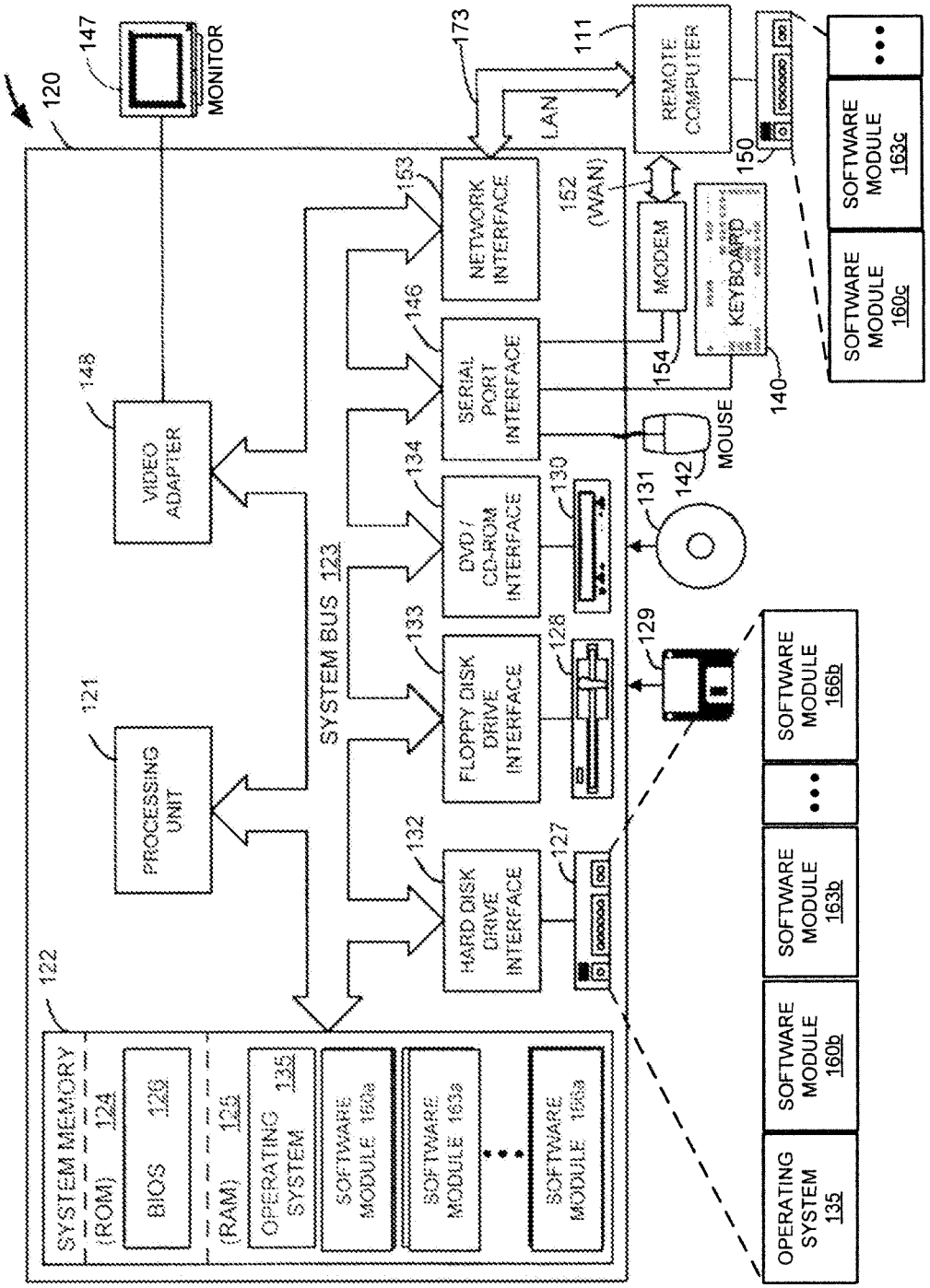
Figure 8 – Architecture for a computing device

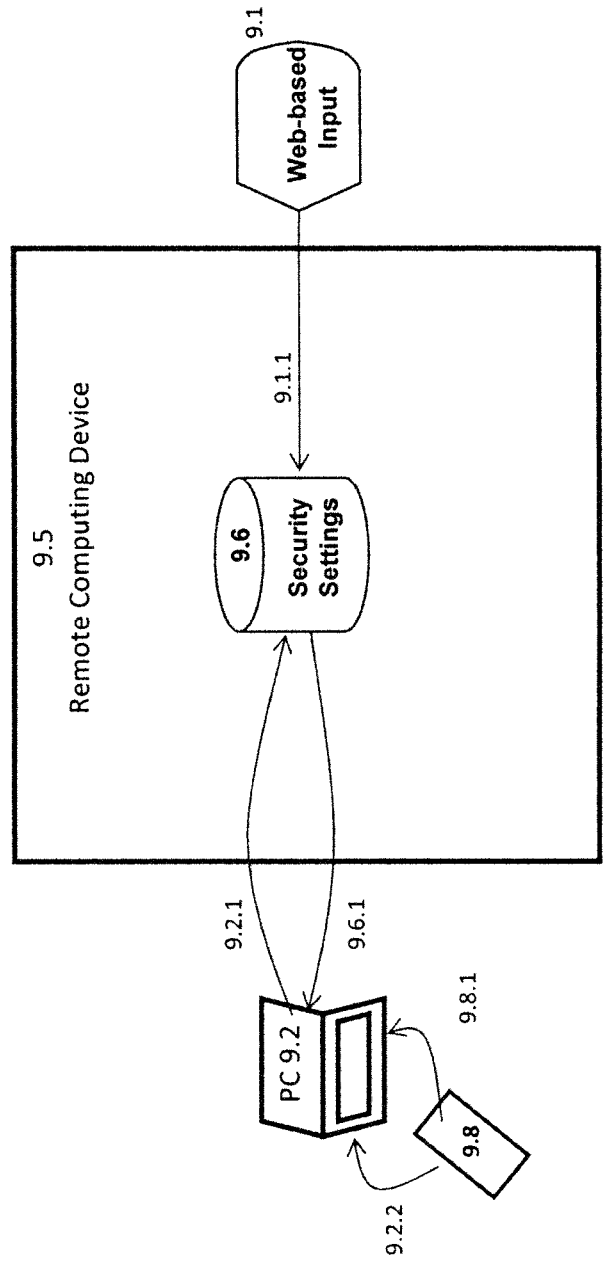
Figure 9 - Architecture For Remote Security Settings

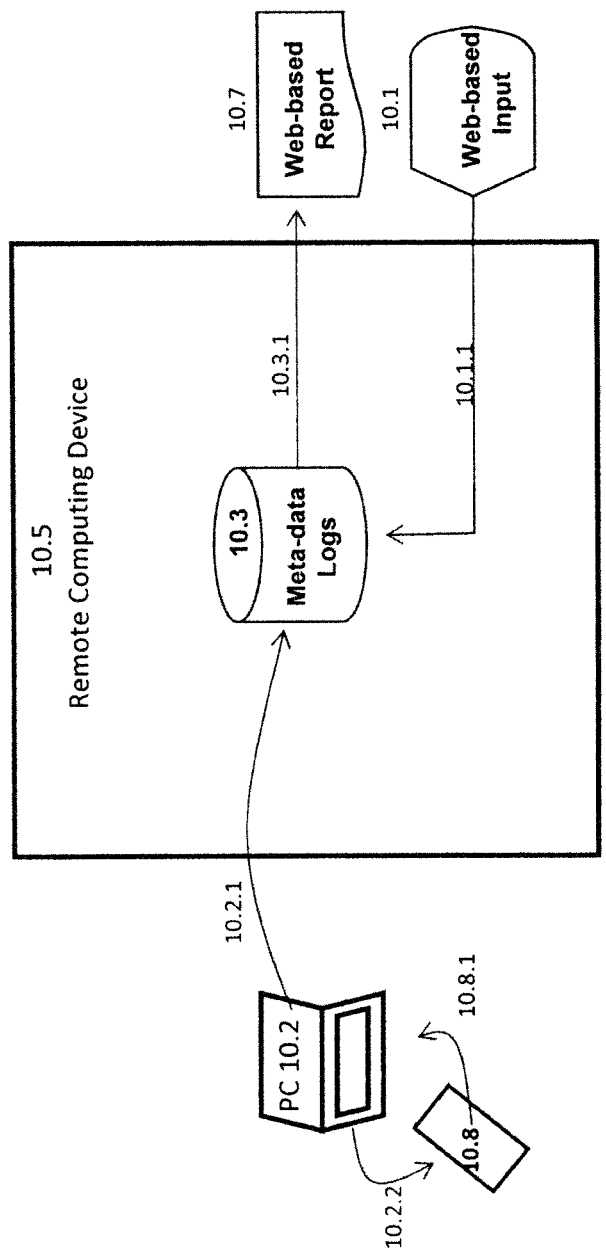
Figure 10 - Architecture For Reporting the Movement of Data

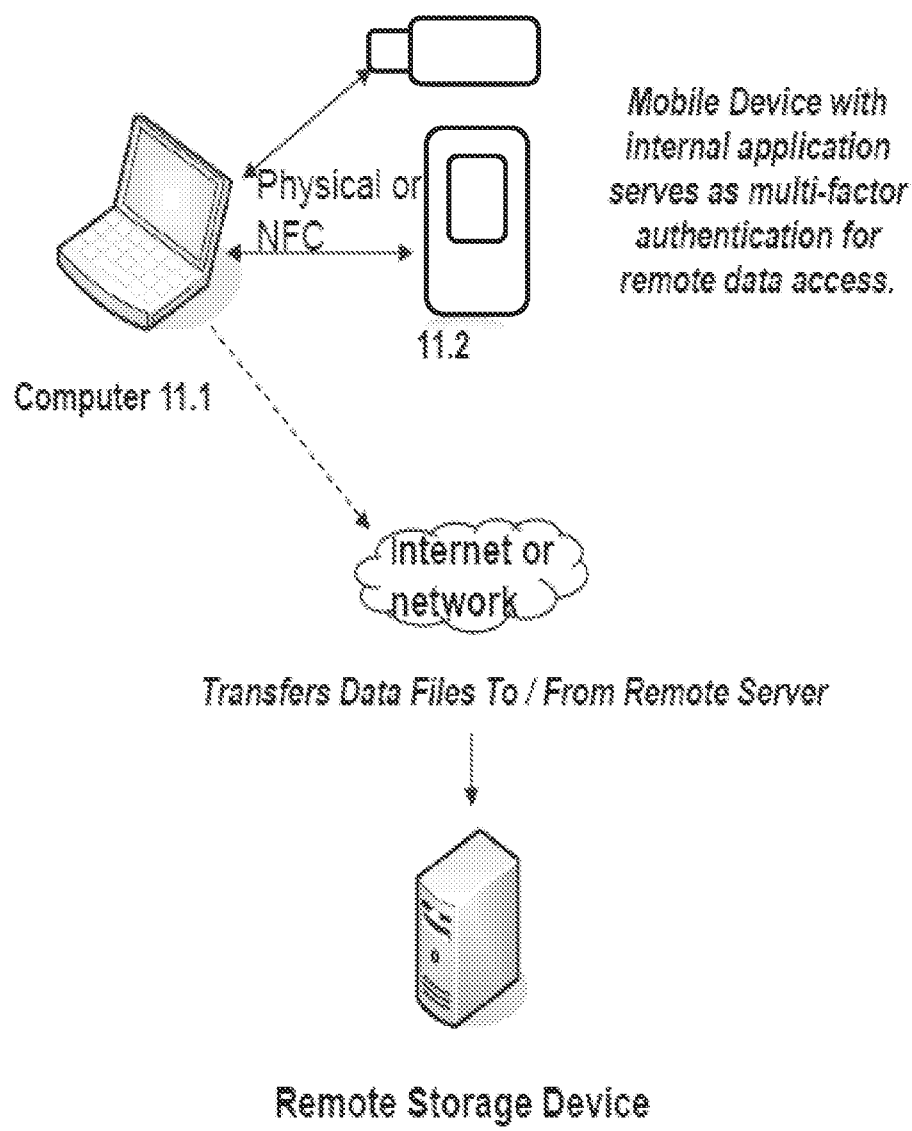

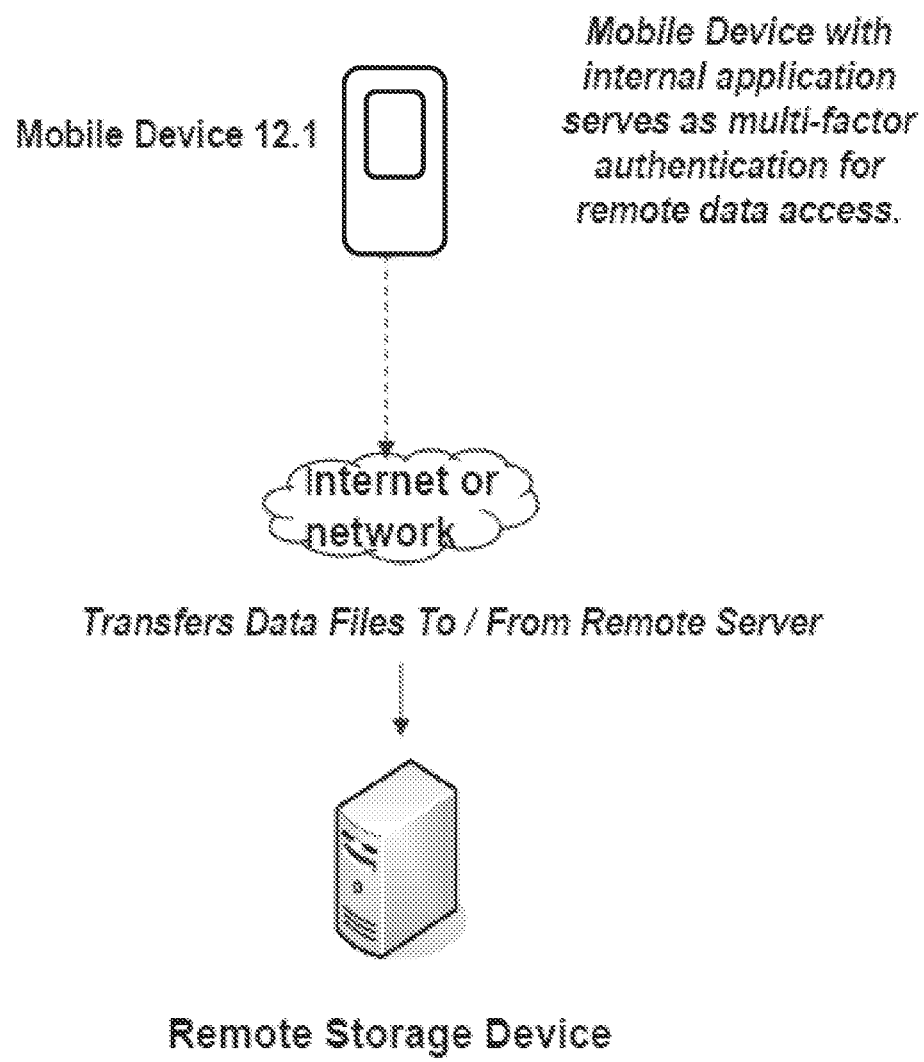
Figure 12 - Multi Factor Authentication (uses CPU resources of mobile device)

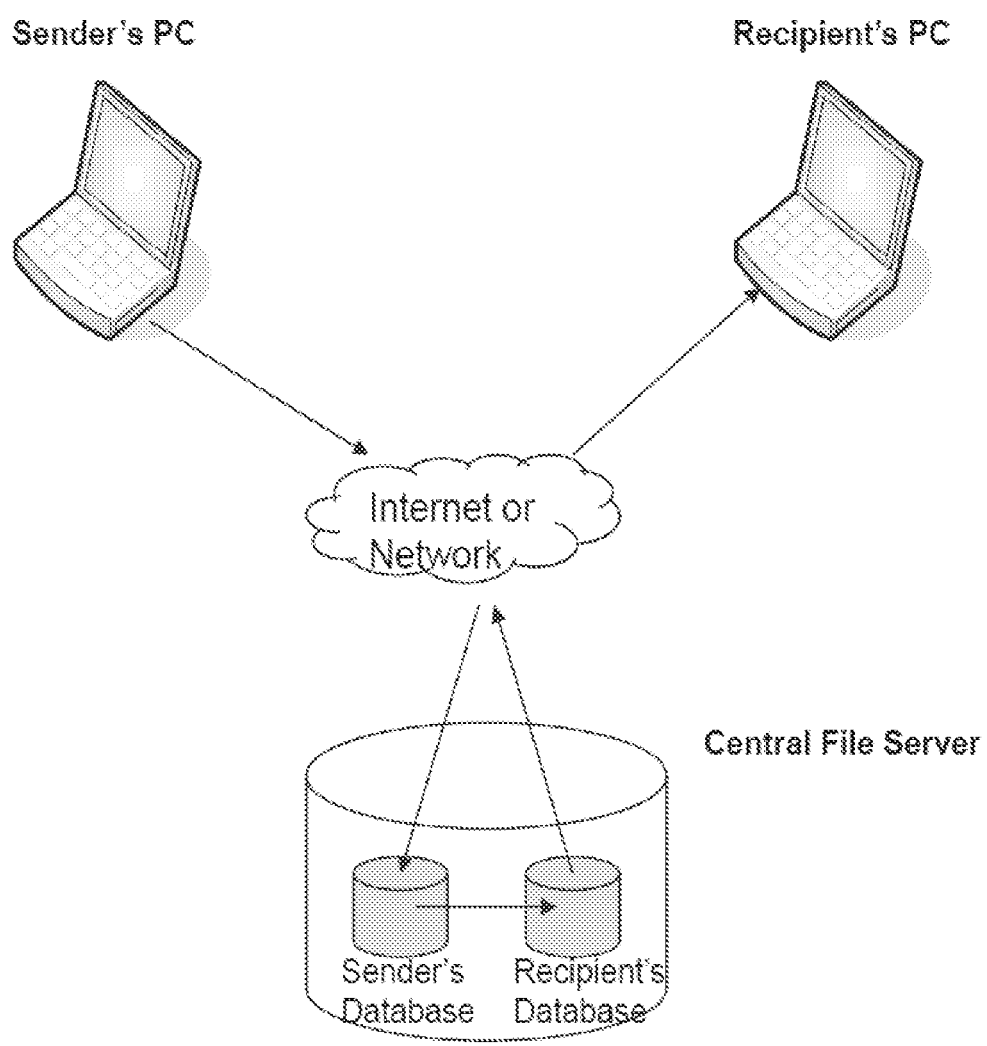
Figure 13 SECURE DIGITAL FILE SHARING

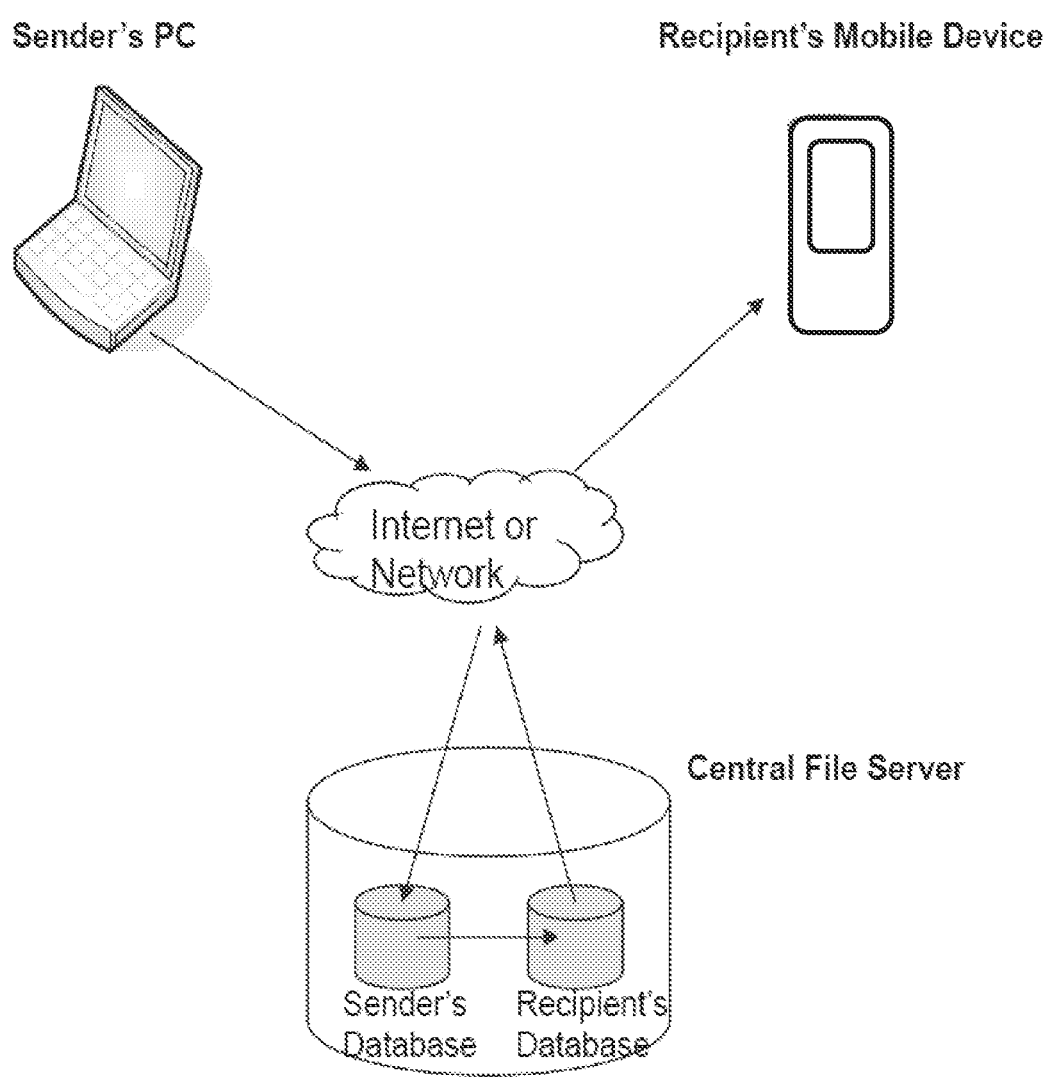
Figure 14 SECURE DIGITAL FILE SHARING

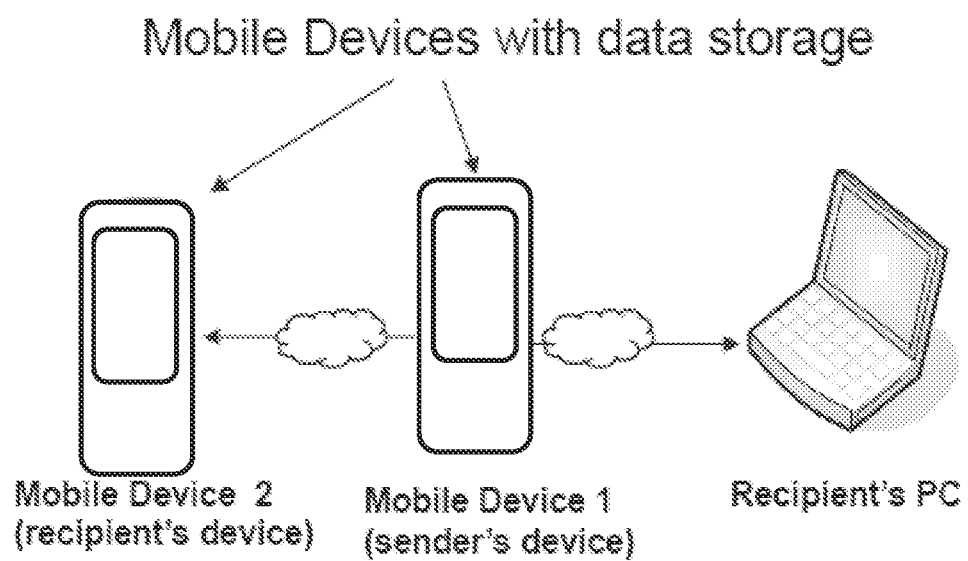
Figure 15 SECURE MOBILE DATA SHARING

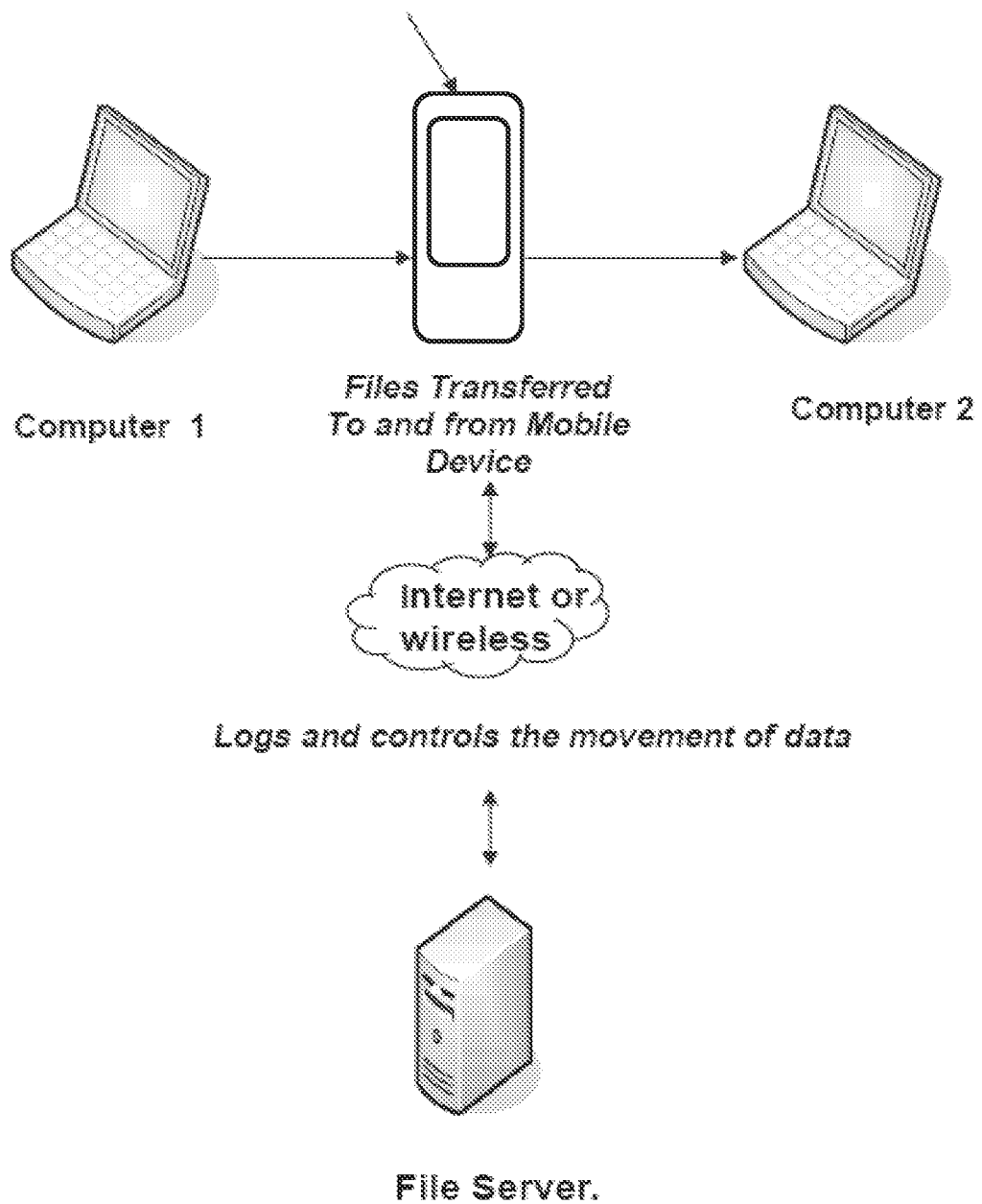

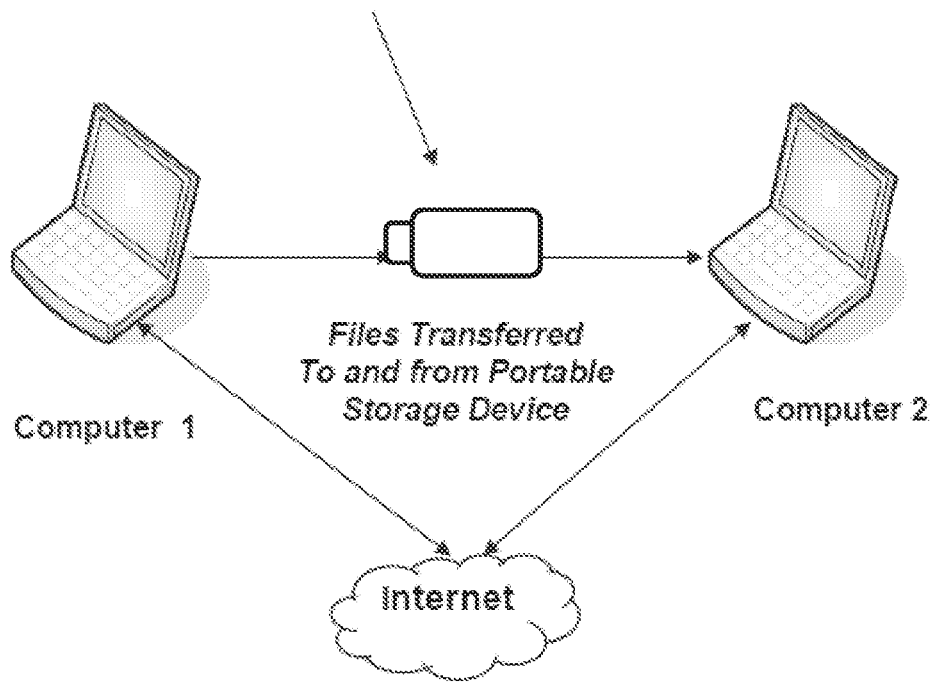
Figure 17 - Mobile Data Security

METHOD AND SYSTEM FOR REMOTE DATA ACCESS

RELATED APPLICATIONS

This application is a continuation of and claims priority to U.S. patent application Ser. No. 17/836,587, filed Jun. 9, 2022, and titled "Method and System for Remote Data Access," which is a continuation of and claims priority to U.S. patent application Ser. No. 16/395,636, filed Apr. 26, 2019, and titled "Method and System for Remote Data Access," which is a continuation of and claims priority to U.S. patent application Ser. No. 16/056,525, filed Aug. 7, 2018, and titled "Method and System for Remote Data Access," which is a continuation of and claims priority to U.S. patent application Ser. No. 15/476,556, filed Mar. 31, 2017, and titled "Method and System for Remote Data Access Using a Mobile Device," which is a continuation of and claims priority to U.S. patent application Ser. No. 14/990,438, filed Jan. 7, 2016, and titled "Method and System for Remote Data Access Using a Mobile Device," which is a continuation of and claims priority to U.S. patent application Ser. No. 14/542,093, filed Nov. 14, 2014, and titled "Method and System for Remote Data Access Using a Mobile Device," which is a continuation of and claims priority to U.S. patent application Ser. No. 14/323,952, filed Jul. 3, 2014, and titled "Method and System for Secure Mobile Messaging," which is a continuation of and claims priority to U.S. patent application Ser. No. 13/306,155, filed Nov. 29, 2011, and titled "Method and System for Secure Mobile File Sharing," which is a continuation of and claims priority to U.S. patent application Ser. No. 12/466,989, filed May 15, 2009, and titled "Method and System for Mobile Data Security" which claims the benefit of priority of the following U.S. provisional applications:

| application Ser. No. | Filed On |
| --- | --- |
| 61/127,960 | May 16, 2008 |
| 61/130,223 | May 29, 2008 |
| 61/130,207 | May 29, 2008 |
| 61/130,189 | May 29, 2008 |
| 61/130,206 | May 29, 2008 |

All of the foregoing non-provisional and provisional applications are hereby incorporated herein by reference.

COPYRIGHT NOTICE

A portion of the disclosure of this patent document may contain material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

This invention relates to a system and method for securely storing, retrieving and sharing data using PCs and mobile devices and for controlling and tracking the movement of data to and from a variety of computing and storage devices.

BACKGROUND OF THE INVENTION

The number of personal computers and mobile devices capable of sending and storing data increases significantly each year. These devices are routinely used to store files containing personal as well as confidential business information. Security administrators and business owners often have no record of what data is stored on PCs and mobile devices at any given point in time. For example, if a computing or storage device is lost or stolen, it is problematic to determine after the fact exactly what information was lost and/or disclosed with the device. There are also significant regulatory exposures related to the disclosure of certain classes of data such as medical information (HIPAA) and Payment Card Industry (PCI) data.

Individuals and businesses often share data files by sending these files as email attachments over the Internet. Although encryption methods are available, many users do not encrypt attachments prior to email transmission. Therefore, there is a risk that data files sent as attachments in email messages may be disclosed to an unauthorized recipient. Furthermore, using current methods, security administrators and business owners have no reliable mechanisms to control or track the movement of data sent by email between users of PCs or mobile devices.

In recent years the numbers of mobile storage devices such as USB flash drives and mobile communication devices with internal, non-volatile flash memory have also increased significantly. A significant amount of personal and confidential data can be stored on USB flash drives and mobile communication devices with non-volatile storage such as micro SD cards. Conventional methods allow data to be encrypted prior to storage onto these devices; however, conventional methods lack a mechanism for limiting access to confidential data once stored on these devices. Furthermore, there are no current methods which can serve to monitor and control the movement of data from non-volatile flash memory to other computing devices. Because laptop computers are highly mobile, it is not uncommon for laptop computers to fall outside of the regular backup processes which otherwise may be in place for fixed (desktop) PCs and corporate servers. Recognizing this need, there has been a trend in new services (such as Carbonite, Iron Mountain, RackSpace/Jungle Disk, and EMC/Mozy) that offer remote backup services to backup the data stored on laptop PCs. However, these services lack capabilities for security administrators and business owners to track, monitor and enforce compliance with policies. Also, using these products, there is little utility value that can be derived from the remotely stored data for purposes beyond simple backup and restore. Specifically, these remote backup services do not offer users the ability to ubiquitously access and/or share backed-up data from thin-client (WEB) or mobile (WAP) based interfaces.

Along with the trend in mobile computing, there has been an increased demand for Internet access and data sharing from a variety of users and businesses. Today, wireless broadband modems enable the mobile user to gain internet access using the cellular networks of wireless network operators such as (AT&T, Verizon, T-Mobile, and Sprint). However, these carriers have limited capacity to support peer-to-peer data transfers over wireless networks. Many of these same wireless carriers also offer DSL-based or Cable-based high speed Internet access. These high speed data services have become highly commoditized in recent years with the key competitive focus on download speeds. Within the major carriers (AT&T, Verizon, Sprint), there is little functional or technical synergy between wireless and wired services. Carriers need new value-added services that can increase customer retention and bridge the gaps between wired and wireless-based services. Services such as secure remote file storage and secure file sharing would be effective value added offerings for the adept mobile network operator interested in proactively managing its limited wireless network resources and looking for new sources of revenue and increasing customer retention.

Given these collective limitations of the prior art and the numerous needs and opportunities stated herein, a system and method are needed that can provide an architecture for securely storing, retrieving, and sharing data using PCs and mobile devices and for controlling and tracking the movement of data to and from a variety of devices.

SUMMARY OF THE INVENTION

The invention satisfies the above-described and other related needs by providing a method and system for security administrators, business owners and individuals to know what data is stored on mobile devices; to limit how data is shared between users; to track the movement of data between users, PCs, and mobile devices; and to provide ubiquitous access to remote data based on a multi-factor security framework.

In one exemplary embodiment, the invention provides a method for mobile data security. A mobile device can include a stored computer software program and database. The mobile device can be connected to a first PC operable to validate the device based on security settings that can be accessed from a remote computing device. Upon validation, data can be transferred from the first PC onto the mobile device. The first PC can communicate to the remote computing device the details related to the files that were transferred to the mobile device. These details related to the files that were transferred from the first PC to the mobile device can be stored on the remote computing device as meta-data logs. The mobile device can later be connected to a second PC operable to receive files transferred from the mobile device. The second PC can communicate to the remote computing device the details related to the files that were received from the mobile device. These details related to the files that were transferred from the mobile device to the second PC can be stored on the remote computing device as meta-data logs.

In another exemplary embodiment, the invention provides a system for mobile data security. A mobile device can include a stored computer software program and database. The mobile device can be connected to a first PC operable to validate the device based on security settings that can be accessed from a remote computing device. Upon validation, data can be transferred from the first PC onto the mobile device. The first PC can communicate to the remote computing device the details related to the files that were transferred to the mobile device. These details related to the files that were transferred from the first PC to the mobile device can be stored on the remote computing device as meta-data logs. The mobile device can later be connected to a second PC operable to receive files transferred from the mobile device. The second PC can communicate to the remote computing device the details related to the files that were received from the mobile device. These details related to the files that were transferred from the mobile device to the second PC can be stored on the remote computing device as meta-data logs.

In yet another exemplary embodiment, the invention comprises a method for multi-factor remote data access. A multi-factor authentication system uses three or more unique pieces of information to verify the identity of a person or other entity requesting access under security constraints. A mobile device can be connected to a first PC. The mobile device can include a stored computer software program and database. The first PC can be operable to execute the software stored on the mobile device. The software on the mobile device can transfer data from the first PC to a remote storage device comprised within a remote computing device. A record of the details related to the data that is transferred from the first PC to the remote storage device can be stored in the database on the mobile device. A corresponding record of the details of the data that is transferred from the first PC to the remote storage device can be stored on the remote computing device as meta-data logs. The mobile storage device can be connected to a second PC. The second PC can be operable to execute the software stored on the mobile device. Using security settings that can be stored on the remote computing device, the software on the mobile device can validate if the second PC is authorized to receive data that was previously transferred from the first PC. If the second PC is authorized to receive data from the first PC, the software on the mobile device can transfer data from the remote storage device to the second PC. A record of the details of the data that can be transferred from the remote storage device to the second PC can be stored as meta-data on the remote computing device. A corresponding record of the details of the data that can be transferred from the remote storage device to the second PC can be stored in the database on the mobile device.

In yet another embodiment, the invention comprises a system for multi-factor remote data access. A mobile device can be connected to a first PC. The mobile device can include a stored computer software program and database. The first PC can be operable to execute the software stored on the mobile device. The software on the mobile device can transfer data from the first PC to a remote storage device comprised within a remote computing device. A record of the details related to the data that is transferred from the first PC to the remote storage device can be stored in the database on the mobile device. A corresponding record of the details of the data that is transferred from the first PC to the remote storage device can be stored on the remote computing device as meta-data logs. The mobile storage device can be connected to a second PC. The second PC can be operable to execute the software stored on the mobile device. Using security settings that can be stored on the remote computing device, the software on the mobile device can validate if the second PC is authorized to receive data that was previously transferred from the first PC. If the second PC is authorized to receive data from the first PC, the software on the mobile device can transfer data from the remote storage device to the second PC. A record of the details of the data that can be transferred from the remote storage device to the second PC can be stored as meta-data on the remote computing device. A corresponding record of the details of the data that can be transferred from the remote storage device to the second PC can be stored in the database on the mobile device.

In yet another embodiment, the invention comprises a method for secure digital file sharing. A first PC can be operable to encrypt and transfer data to a remote storage device comprised within a remote computing device. The first PC can store details about the data that can be stored on the remote storage device as meta-data logs on the remote computing device. Meta-data logs can contain the encryption key that was used by the first PC to encrypt the data that can be transferred to the remote storage device. Security settings can govern how remotely stored data can be shared with other users and other PCs. If permitted by security settings, an email can be sent at the request of the first PC from the remote computing device to a second PC with instructions regarding data files that can be shared with the user of the second PC. Instructions can include an imbedded link to the data that can be downloaded from the remote storage device. The remote computing device can validate the download request received from the second PC using security settings stored on the remote computing device. If the user of the second PC is authorized to receive files from the user of the first PC, files can be decrypted using the encryption key stored in the meta-data logs by the first PC. Decrypted files can be downloaded onto the second PC. A record of the details of the data that can be downloaded from the remote storage device to the second PC can be stored as meta-data on remote computing device.

In yet another embodiment, the invention comprises a system for secure digital file sharing. A first PC can be operable to encrypt and transfer data to a remote storage device comprised within a remote computing device. The first PC can store details about the data that can be stored on the remote storage device as meta-data logs on the remote computing device. Meta-data logs can contain the encryption key that was used by the first PC to encrypt the data that can be transferred to the remote storage device. Security settings can govern how remotely stored data can be shared with other users and other PCs. If permitted by security settings, an email can be sent at the request of the first PC from the remote computing device to a second PC with instructions regarding data files that can be shared with the user of the second PC. Instructions can include an imbedded link to the data that can be downloaded from the remote storage device. The remote computing device can validate the download request received from the second PC using security settings stored on the remote computing device. If the user of the second PC is authorized to receive files from the user of the first PC, files can be decrypted using the encryption key stored in the meta-data logs by the first PC. Decrypted files can be downloaded onto the second PC. A record of the details of the data that can be downloaded from the remote storage device to the second PC can be stored as meta-data on remote computing device.

In yet another embodiment, the invention comprises a method for secure mobile data sharing. A first mobile device can be operable to encrypt and transfer data to a remote storage device comprised within a remote computing device. The first mobile device can store details about the data that can be stored on the remote storage device as meta-data logs on the remote computing device. Meta-data logs can contain the encryption key that was used by the first mobile device to encrypt the data that can be transferred to the remote storage device. Security settings can govern how remotely stored data can be shared with other users and other mobile devices. If permitted by security settings, a text message can be sent at the request of the first mobile device from the remote computing device to a second mobile device with instructions regarding data files that can be shared with the user of the second mobile device. Instructions can include an imbedded link to the data that can be downloaded from the remote storage device. The remote computing can validate the download request received from the second mobile device using security settings stored on the remote computing device. If the user of the second mobile device is authorized to receive files from the user of the first mobile device, files can be decrypted using the encryption key stored in the meta-data logs by the first mobile device. Decrypted files can be downloaded onto the second mobile device. A record of the details of the data that can be downloaded from the remote storage device to the second mobile device can be stored as meta-data on the remote computing device.

In yet another embodiment, the invention comprises a system for secure mobile data sharing. A first mobile device can be operable to encrypt and transfer data to a remote storage device comprised within a remote computing device. The first mobile device can store details about the data that can be stored on the remote storage device as meta-data logs on the remote computing device. Meta-data logs can contain the encryption key that was used by the first mobile device to encrypt the data that can be transferred to the remote storage device. Security settings can to govern how remotely stored data can be shared with other users and other mobile devices. If permitted by security settings, a text message can be sent at the request of the first mobile device from the remote computing device to a second mobile device with instructions regarding data files that can be shared with the user of the second mobile device. Instructions can include an imbedded link to the data that can be downloaded from the remote storage device. The remote computing device can validate the download request received from the second mobile device using security settings stored on the remote computing device. If the user of the second mobile device is authorized to receive files from the user of the first mobile device, files can be decrypted using the encryption key stored in the meta-data logs by the first mobile device. Decrypted files can be downloaded onto the second mobile device. A record of the details of the data that can be downloaded from the remote storage device to the second mobile device can be stored as meta-data on the remote computing device.

In yet another embodiment, the invention comprises a method for managing and enforcing remote security settings. A first input device can be operable to add, change, or delete security settings stored within a remote storage device comprised within a remote computing device. A first mobile device can be connected to a first PC. A software application resident within the first mobile device can be executed by the CPU of the first PC. The software application can request data to be transferred to the first PC from the mobile device. The first PC can send the request to the remote computing device. The remote computing device can approve or deny the request based on the security settings that are stored within the remote storage device. The approval or denial of the request can be sent back to the software application on the mobile device. If the request is approved, data may be transferred in accordance with the request.

In yet another embodiment, the invention comprises a system for managing and enforcing remote security settings. A first input device can be operable to add, change, or delete security settings stored within a remote storage device comprised within a remote computing device. A first mobile device can be connected to a first PC. A software application resident within the first mobile device can be executed by the CPU of the first PC. The software application can request data to be transferred to the first PC from the mobile device. The first PC can send the request to the remote computing device. The remote computing device can approve or deny the request based on the security settings that are stored within the remote storage device. The approval or denial of the request can be sent back to the software application on the mobile device. If the request is approved, data may be transferred in accordance with the request.

In yet another embodiment, the invention comprises a method for reporting the movement of data to and from mobile devices. A first mobile device can be connected to a first PC. Data can be transferred from the first mobile device to the first PC. A record of the data that can be transferred from the first mobile device to the first PC can be transferred to a remote computing device comprising a meta data log file. The remote computing device can be operable to store the received record into the meta data log file. A first input device can be operable to request information about the movement of data from the first mobile device to the first PC. The remote computing device can receive and process the information request using data contained within the meta data log file. A report can be produced by the remote computing device based on the information request. The report can be delivered to a first output device.

In yet another embodiment, the system comprises a system for reporting the movement of data to a mobile device. A first mobile device can be connected to a first PC. Data can be transferred from the first mobile device to the first PC. A record of the data that can be transferred from the first mobile device to the first PC can be transferred to a remote computing device comprising a meta data log file. The remote computing device can be operable to store the received record into the meta data log file. A first input device can be operable to request information about the movement of data from the first mobile device to the first PC. The remote computing device can receive and process the information request using data contained within the meta data log file. A report can be produced by the remote computing device based on the information request. The report can be delivered to a first output device.

The foregoing exemplary embodiments and other embodiments will be discussed in greater detail in the Detailed Description in connection with the attached drawings illustrating the best mode for carrying out the invention as presently perceived.

BRIEF DESCRIPTION OF THE DRAWINGS

FIG. 1 illustrates an architecture for mobile data security using a mobile storage device in accordance with an exemplary embodiment of the invention.

FIG. 2 illustrates an architecture for mobile data security using a mobile communication device in accordance with an exemplary embodiment of the invention.

FIG. 3 illustrates an architecture for multi-factor remote data access using a mobile storage device in accordance with an exemplary embodiment of the invention.

FIG. 4 illustrates an architecture for multi-factor remote data access using a mobile communication device in accordance with an exemplary embodiment of the invention.

FIG. 5 illustrates an architecture for securely sharing data files between PCs in accordance with an exemplary embodiment of the invention.

FIG. 6 illustrates an architecture for securely sharing data files between a PC and a mobile device in accordance with an exemplary embodiment of the invention.

FIG. 7 illustrates an architecture for securely sharing data files between mobile devices in accordance with an exemplary embodiment of the invention.

FIG. 8 illustrates an architecture for a computing device in accordance with an exemplary embodiment of the invention.

FIG. 9 illustrates an architecture for remote security settings in accordance with an exemplary embodiment of the invention.

FIG. 10 illustrates an architecture for reporting the movement of data to and from PCs and mobile devices in accordance with an exemplary embodiment of the invention.

FIG. 11 is an overview of the primary components that support the invention embodiments. Components include:
(i) Computer 1
(ii) Mobile device or USB flash drive with internal non-volatile flash memory
(iii) Connection to Computer 1 either through a physical connection or through a near field communication method.
(iv) Network connection or communication session
(v) Remote Storage Device FIG. 12 is an alternate overview of the primary components that support the invention embodiments. Components include:
(i) Portable Storage Device
(ii) Mobile device with internal non-volatile flash memory
(iii) Network connection or communication session
(iv) Remote Storage Device FIG. 13 is an overview of the primary components that support the invention embodiments. Components include:
(i) Computer 1 (sender's PC) with software application and encryption keys
(ii) Computer 2 (recipient's PC) with software application and encryption keys
(iii) Network connection or communication session
(iv) Central file server with relational databases for each sender and recipient.

FIG. 14 is an overview of the primary components that support the invention embodiments. Components include:
(i) Computer 1 (sender's PC) with software application and encryption keys
(ii) Mobile device with software application and encryption keys
(iii) Network connection or communication session
(iv) Central file server with relational databases for each sender and recipient.

FIG. 15 is an overview of the primary components that support the invention embodiments. Components include:
(i) Mobile device 1 with internal non-volatile flash memory
(ii) Mobile device 2 with internal non-volatile flash memory
(iii) Computer 1 (recipient's PC)
(iv) Network connection or communication session FIG. 16 is an overview of the primary components that support the invention embodiments. Components include:
(i) Computer 1
(ii) Mobile device with internal non-volatile flash memory
(iii) Computer 2
(iv) Network connection or communication session
(v) File Server FIG. 17 is an alternate overview of the primary components that support the invention embodiments. Components include:
(i) Computer 1
(ii) Portable Storage Device
(iii) Computer 2
(iv) Network connection or communication session
(v) File Server

DETAILED DESCRIPTION OF THE EXEMPLARY EMBODIMENTS

The present invention answers these needs by providing several approaches for systems and methods for securely storing, sharing, and tracking the movement of data on PCs and mobile devices.

In embodiments of the present invention as illustrated in FIG. 1, a mobile storage device (1.2) comprising a non-volatile flash memory, software application and database is physically connected to PC (1.1). Upon connection with the mobile device, the CPU of PC (1.1) executes software application (1.2.2) and identifies the mobile device (1.2) using data contained in message (1.2.1). PC (1.1) sends authentication request (1.1.1) to remote computing device (1.5). The authentication request (1.1.1) contains a unique mobile device serial number and a unique software license key that are passed from the mobile device (1.2) to the PC (1.1) using message (1.2.1). The authentication request (1.1.1) also contains a serial number to uniquely identify the PC (1.1). The remote computing device (1.5) receives the authentication request (1.1.1) from PC (1.1). The remote computing device (1.5) retrieves from the security settings file (1.6) unique security settings related to the mobile device using the unique software license key and validates that the license key is authorized for use with the mobile device.

If the license key and mobile device serial numbers are determined to be a valid combination, the software application is further validated to determine if it is authorized for use on the connected PC (1.1). If the mobile device (1.2) and software license key for software application (1.2.2) are valid for use with PC (1.1), message (1.6.1) is returned to PC (1.1) indicating that data may be transferred from PC (1.1) onto mobile device (1.2) using message (1.1.2).

Upon receipt of message (1.1.2) the software application (1.2.2) copies transferred data into the database (1.2.4). Data is encrypted prior to storage into database (1.2.4) using an encryption key that is uniquely related to the license key for software application (1.2.2). Software application (1.2.2) executed using the CPU and network resources of PC (1.1) stores details (which can include one or more of: file names, date created, date stored, originating PC, and originating volume) related to data transferred to the mobile storage device into mobile device database (1.2.4) and sends message (1.1.3) to remote computing device (1.5) containing same details of data transferred from PC (1.1) to mobile device (1.2). Message (1.1.3) is received by remote computing device (1.5) and stored as meta-data logs (1.3).

Mobile device (1.2) is then disconnected from PC (1.1) and connected to PC (1.4). Upon connection with the mobile device, PC (1.4) executes software application (1.2.2) and identifies the mobile device (1.2) with data contained in message (1.2.3). The authentication request (1.4.1) contains a unique mobile device serial number and a unique software license key that are first passed from the mobile device (1.2) to the PC (1.4) using message (1.2.3). PC (1.4) sends authentication request (1.4.1) to remote computing device (1.5). The authentication request (1.4.1) also contains a serial number to uniquely identify the PC.

The remote computing device (1.5) receives the authentication request (1.4.1) from PC (1.4). The remote computing device (1.5) retrieves from the security settings file (1.6) the unique settings related to the mobile device using the unique software license key and validates that the license key is authorized for use with the mobile device. If the license key and mobile device serial numbers are determined to be a valid combination, the software application is further validated to determine if it is authorized for use on the connected PC (1.4). If the mobile device (1.2) and software license key for software application (1.2.2) are valid for use with PC (1.4), message (1.6.2) is returned to software application (1.2.2) executed by PC (1.4) indicating that data may be transferred from mobile device (1.2) to PC (1.4).

Data is then transferred from mobile device (1.2) onto PC (1.4) using message (1.2.5). Data is decrypted prior to storage using an encryption key that is uniquely related to the license key for software application (1.2.2). Software application (1.2.2) executed using the CPU and network resources of PC (1.4) stores details (e.g. file names, date transferred, destination PC, destination volume) related to each file transferred from the mobile storage device to the PC (1.4) into mobile device database (1.2.4) and sends message (1.4.2) containing the same details of data transferred from mobile device (1.2) to PC (1.4). Message (1.4.2) is received by remote computing device (1.5) and stored as meta-data logs (1.3). It should be appreciated by those who are skilled in the art that a variety of methods of communication between the PCs, mobile devices, and the remote computing device (e.g. http, https, xml, ftp, etc.) may be used and the invention should not be construed as limited to any one set communication protocol or data format.

In other embodiments of the present invention as illustrated in FIG. 2, a mobile communication device (2.2) comprising at least a CPU, operating system, wireless antenna, non-volatile flash memory, software application and database is connected to PC (2.1) using a wireless communication method such as Bluetooth or other near field communication (NFC) method. Upon connection with the mobile device, PC (2.1) executes software application (2.2.2) and identifies the mobile device (2.2) using data contained in message (2.2.1). PC (2.1) sends authentication request (2.1.1) to remote computing device (2.5). The authentication request (2.1.1) contains a unique mobile device serial number and a unique software license key that are passed from the mobile device (2.2) to the PC (2.1) using message (2.2.1). The authentication request (2.1.1) also contains a serial number to uniquely identify the PC (2.1). The remote computing device (2.5) receives the authentication request (2.1.1) from PC (2.1). The remote computing device (2.5) retrieves from the security settings file (2.6) unique security settings related to the mobile device using the unique software license key and validates that the license key is authorized for use with the mobile device. If the license key and mobile device serial numbers are determined to be a valid combination, the software application is further validated to determine if it is authorized for use on the connected PC (2.1).

If the mobile device (2.2) and software license key for software application (2.2.2) are valid for use with PC (2.1), message (2.6.1) is returned to PC (2.1) indicating that data may be transferred from PC (2.1) onto mobile device (2.2) using message (2.1.2). Upon receipt of message (2.1.2), the software application (2.2.2) copies transferred data into the database (2.2.4). Data is encrypted prior to storage into database (2.2.4) using an encryption key that is uniquely related to the license key for software application (2.2.2). Software application (2.2.2) executed using the CPU and network resources of PC (2.1) stores details (which can include one or more of: file name, date created, date stored, originating PC, and originating volume) related to data transferred to the mobile storage device into mobile device database (2.2.4) and sends message (2.1.3) to remote computing device (2.5) containing details of data transferred from PC (2.1) to mobile device (2.2). Message (2.1.3) is received by remote computing device (2.5) and stored as meta-data logs (2.3).

Mobile device (2.2) is then disconnected from PC (2.1) and connected to PC (2.4) using a wireless communication method such as Bluetooth or other near field communication (NFC) method. Upon connection with the mobile device, PC (2.4) executes software application (2.2.2) and identifies the mobile device (2.2) using data contained in message (2.2.3). The authentication request (2.4.1) contains a unique mobile device serial number and a unique software license key that are first passed from the mobile device (2.2) to the PC (2.4) using message (2.2.3). The authentication request (2.4.1) also contains a serial number to uniquely identify the PC (2.4). The remote computing device (2.5) receives the authentication request (2.4.1) from PC (2.4). The remote computing device (2.5) retrieves from the security settings file (2.6) the unique settings related to the mobile device using the unique software license key and validates that the license key is authorized for use with the mobile device. If the license key and mobile device serial numbers are determined to be a valid combination, the software application is further validated to determine if it is authorized for use on the connected PC (2.4). If the mobile device (2.2) and software license key for software application (2.2.2) are valid for use with PC (2.4), message (2.6.2) is returned to software application (2.2.2) executed by PC (2.4) indicating that data may be transferred from mobile device (2.2) to PC (2.4).

Data is transferred from mobile device (2.2) onto PC (2.4) using message (2.2.5). Data is decrypted prior to storage using an encryption key that is uniquely related to the license key for software application (2.2.2). Software application (2.2.2) executed using the CPU and network resources of PC (2.4) stores details (which can include one or more of the following: file name, date transferred, destination PC, destination volume) related to each file transferred from the mobile communication device to the PC (2.4) into mobile device database (2.2.4) and sends message (2.4.2) containing the same details of data transferred from mobile communication device (2.2) to PC (2.4). Message (2.4.2) is received by remote computing device (2.5) and stored as meta-data logs (2.3).

It should be appreciated by those who are skilled in the art that a variety of communication protocols and data formats between the PCs, mobile devices, and the remote computing device (e.g. http, https, xml, ftp, etc.) may be used and the invention should not be construed as limited to any one set communication protocol or data format. It should also be appreciated that the software application (2.2.2) may be executed using the CPU and network resources of the mobile communication device. Under this scenario, the above described messages (e.g. 2.1.1, 2.1.2, 2.1.3, 2.4.1, 2.6.2, 2.4.3) could utilize alternate message flow (2.2.6).

In other embodiments of the present invention as illustrated in FIG. 3, a mobile storage device (3.2) comprising a non-volatile flash memory, software application and database is physically connected to PC (3.1). Upon connection with the mobile device, PC (3.1) executes software application (3.2.2) and identifies the mobile device (3.2) using data contained in message (3.2.1). The authentication request contains a unique mobile device serial number and a unique software license key that are passed from the mobile device (3.2) to the PC (3.1) using message (3.2.1). PC (3.1) sends an authentication request (3.1.1) to remote computing device (3.5). The authentication request (3.1.1) contains the software license key and mobile device serial number obtained from message (3.2.1). Message (3.1.1) also contains a serial number to uniquely identify the PC (3.1).

The remote computing device (3.5) receives the authentication request (3.1.1) from PC (3.1). The remote computing device (3.5) retrieves from the security settings file (3.6) unique security settings related to the mobile device using the unique software (3.2.2) license key and validates that the software (3.2.2) license key is authorized for use with the mobile device (3.2). If the license key and mobile device serial numbers are determined to be a valid combination, the software application is further validated to determine if it is authorized for use on the connected PC (3.1). If the mobile device (3.2) and software license key for software application (3.2.2) are valid for use with PC (3.1), message (3.6.1) is returned to software application (3.2.2) and executed by PC (3.1) indicating that data may be transferred to remote computing device (3.5) from PC (3.1).

Data is transferred (e.g. uploaded) from PC (3.1) onto remote computing device (3.5) using message (3.1.2). Upon receipt of message (3.1.2) the remote computing device (3.5) stores transferred PC data into the remote storage device (3.4). Data is encrypted by software application (3.2.2) prior to uploading and storage into remote storage device (3.4) using an encryption key that is uniquely related to the license key for software application (3.2.2). Software application (3.2.2) executed using the CPU of PC (3.1) sends message (3.1.3) containing details (which can include one or more of: file name, date created, originating PC, originating volume, and date transferred) of data transferred from PC (3.1) to remote storage device (3.4). Message (3.1.3) is stored as meta-data logs on mobile device database (3.2.4). Software application (3.2.2) executed using the CPU and network resources of PC (3.1) sends message (3.1.4) to remote computing device (3.5) containing the same details of data transferred from PC (3.1) to remote storage device (3.4). Message (3.1.4) is received by remote computing device (3.5) and stored as meta-data logs (3.3).

Mobile device (3.2) is then disconnected from PC (3.1) and connected to PC (3.8). Upon connection with the mobile device, PC (3.8) executes software application (3.2.2) and identifies the mobile device (3.2) using data contained in message (3.2.3). The authentication request contains a unique mobile device serial number and a unique software license key that are passed from the mobile device (3.2) to the PC (3.8) using message (3.2.3). PC (3.8) sends an authentication request (3.8.1) to remote computing device (3.5). The authentication request (3.8.1) contains the software (3.2.2) license key and mobile device (3.2) serial number obtained from message (3.2.3). Message (3.8.1) also contains a serial number to uniquely identify the PC (3.8). The remote computing device (3.5) receives the authentication request (3.8.1) from PC (3.8). The remote computing device (3.5) retrieves from the security settings file (3.6) the unique settings related to the mobile device (3.2) using the unique software (3.2.2) license key and validates that the license key is authorized for use with the mobile device. If the license key and mobile device serial numbers are determined to be a valid combination, the software application is further validated to determine if it is authorized for use on the connected PC (3.8).

If the mobile device (3.2) and software license key for software application (3.2.2) are valid for use with PC (3.8), message (3.6.2) is returned to software application (3.2.2) executed by PC (3.8) indicating that data may be transferred from remote computing device (3.5) to PC (3.8). Data is then transferred (e.g. downloaded) from remote storage device (3.4) onto PC (3.8) using message (3.4.1). Upon receipt of message (3.4.1) the software application (3.2.2) stores data downloaded from the remote storage device (3.4) onto PC (3.8). Data is decrypted prior to storage using an encryption key that is uniquely related to the license key for software application (3.2.2).

Software application (3.2.2) using the CPU and network resources of PC (3.8) stores message (3.8.2) containing details (which can include one or more of: file name, date transferred, destination PC, and destination volume) of data downloaded from remote storage device (3.4) to PC (3.8) into mobile database (3.2.4) and sends message (3.8.3) with the same details to remote computing device (3.5). Message (3.8.3) is received by remote computing device (3.5) and stored as meta-data logs (3.3). It should be appreciated by those who are skilled in the art that a variety of methods of communication between the PCs, mobile devices, and the remote computing device (e.g. http, https, xml, ftp, etc.) may be used and the invention should not be construed as limited to any one set communication protocol or data format.

In other embodiments of the present invention as illustrated in FIG. 4, a mobile communication device (4.2) comprising at least a CPU, operating system, wireless antenna, non-volatile flash memory, software application and database is connected to PC (4.1) using a wireless communication method such as Bluetooth or other near field communication (NFC) method. Upon connection with the mobile device, the CPU of PC (4.1) executes software application (4.2.2) and identifies the mobile device (4.2) using data contained in message (4.2.1). The authentication request (4.2.1) contains a unique mobile device serial number and a unique software license key that are passed from the mobile device (4.2) to the PC (4.1) using message (4.2.1). PC (4.1) sends an authentication request (4.1.1) to remote computing device (4.5). The authentication request (4.1.1) contains the software (4.2.2) license key and mobile device (4.2) serial number obtained from message (4.2.1). Message (4.1.1) also contains a serial number to uniquely identify the PC.

The remote computing device (4.5) receives the authentication request (4.1.1) from PC (4.1). The remote computing device (4.5) retrieves from the security settings file (4.6) unique security settings related to the mobile communication device (4.2) using the unique software (4.2.2) license key and validates that the license key is authorized for use with the mobile device. If the license key and mobile device serial numbers are determined to be a valid combination, the software application is further validated to determine if it is authorized for use on the connected PC (4.1). If the mobile device (4.2) and software license key for software application (4.2.2) are valid for use with PC (4.1) message (4.6.1) is returned to software application (4.2.2) executed by PC (4.1) indicating that data may be transferred to remote computing device (4.5) from PC (4.1).

Data is then transferred (e.g. uploaded) from PC (4.1) onto remote computing device (4.5) using message (4.1.2). Upon receipt of message (4.1.2) the remote computing device (4.5) stores transferred PC data into the remote storage device (4.4). Data is encrypted by software application (4.2.2) prior to upload and storage into remote storage device (4.4) using an encryption key that is uniquely related to the license key for software application (4.2.2). Software application (4.2.2) executed using the CPU of PC (4.1) sends message (4.1.3) containing details (which can include one or more of: file name, date created, originating PC, originating volume, date transferred) of data transferred from PC (4.1) to remote storage device (4.4). Message (4.1.3) is stored as meta-data logs on mobile device database (4.2.4). Software application (4.2.2) executed using the CPU and network resources of PC (4.1) sends message (4.1.4) to remote computing device (4.5) containing the same details of data transferred from PC (4.1) to remote storage device (4.4). Message (4.1.4) is received by remote computing device (4.5) and stored as meta-data logs (4.3).

Mobile device (4.2) is then disconnected from PC (4.1) and connected to PC (4.8) using a wireless communication method such as Bluetooth or other near field communication (NFC) method. Upon connection with the mobile device, PC (4.8) executes software application (4.2.2) and identifies the mobile device (4.2) using data contained in message (4.2.2). The authentication request (4.2.2) contains a unique mobile device (4.2) serial number and a unique software (4.2.2) license key that are passed from the mobile device (4.2) to the PC (4.8) using message (4.2.3). PC (4.8) sends an authentication request (4.8.1) to remote computing device (4.5). The authentication request (4.8.1) contains the software (4.2.2) license key and mobile device (4.2) serial number obtained from message (4.2.2). Message (4.8.1) also contains a serial number to uniquely identify the PC (4.8).

The remote computing device (4.5) receives the authentication request (4.8.1) from PC (4.8). The remote computing device (4.5) retrieves from the security settings file (4.6) the unique settings related to the mobile device (4.2) using the unique software (4.2.2) license key and validates that the license key is authorized for use with the mobile device. If the license key and mobile device serial numbers are determined to be a valid combination, the software application is further validated to determine if it is authorized for use on the connected PC (4.8). If the mobile device (4.2) and software license key for software application (4.2.2) are valid for use with PC (4.8) message (4.6.2) is returned to software application (4.2.2) executed by PC (4.8) indicating that data may be transferred from remote computing device (4.5) to PC (4.8).

Data is transferred (e.g. downloaded) from remote storage device (4.4) onto PC (4.8) using message (4.4.1). Upon receipt of message (4.4.1) the software application (4.2.2) stores data downloaded from the remote storage device (4.4) onto PC (4.8). Data is decrypted prior to storage using an encryption key that is uniquely related to the license key for software application (4.2.2). Software application (4.2.2) executed using the CPU and network resources of PC (4.8) stores message (4.8.2) containing details (which can include one or more of: file name, date transferred, destination PC, and destination volume) of data downloaded from remote storage device (4.4) to PC (4.8) into mobile device database (4.2.4) and sends message (4.8.3) to remote computing device (4.5) with the same details. Message (4.8.3) is received by remote computing device (4.5) and stored as meta-data logs (4.3). It should be appreciated by those who are skilled in the art that a variety of methods of communication between the PCs, mobile devices and the remote computing device (e.g. http, https, xml, ftp, etc.) may be used and the invention should not be construed as limited to any one set communication protocol or data format. It should also be appreciated that the software application (4.2.2) may be executed using the CPU and network resources of the mobile communication device. Under this scenario, the above described messages (e.g. 4.1.1, 4.1.2, 4.1.3, 4.1.4, 4.8.1, 4.6.2) could utilize alternate message flow (4.2.6).

In other embodiments of the present invention as illustrated in FIG. 5, a PC (5.1) comprising at least a CPU, keyboard, display, storage, communication antenna, network card, non-volatile flash memory, software application (5.1.4) and database (5.1.5) executes software application (5.1.4) and requests the authentication of the PC (5.1) using data contained in message (5.1.1). The authentication request (5.1.1) contains a unique PC serial number and a unique software license key that are passed from the PC (5.1) to remote computing device (5.5) using message (5.1.1). The remote computing device (5.5) receives the authentication request (5.1.1) from PC (5.1). The remote computing device (5.5) retrieves from the security settings file (5.6) unique security settings related to the PC (5.1) using the unique software (5.1.4) license key and validates that the license key is authorized for use with the PC. If the software license key for software application (5.1.4) is valid for use with PC (5.1), data is transferred (e.g. uploaded) from PC (5.1) onto remote computing device (5.5) using message (5.1.2).

Upon receipt of message (5.1.2) the remote computing device (5.5) stores transferred PC data into the remote storage device (5.4). Data is encrypted by software application (5.1.4) prior to upload and storage into remote storage device (5.4) using an encryption key that is uniquely related to the license key for software application (5.1.4). Software application (5.1.4) executed using the CPU of PC (5.1) stores details of data transferred from PC (5.1) to remote storage device (5.4) as meta-data logs on PC database (5.1.5). Software application (5.1.4) executed using the CPU and network resources of PC (5.1) sends message (5.1.3) to remote computing device (5.5) containing the same details of data transferred. Message (5.1.3) is received by remote computing device (5.5) and stored as meta-data logs (5.3).

PC (5.1) then sends a data sharing request message (5.1.6) to remote computing device (5.5). Remote computing device (5.5) checks security settings (5.6) to determine if the data sharing request message is authorized for this user. If the data sharing request message is authorized, the remote computing device (5.5) updates security settings (5.6) to enable a security rule with the specific details regarding the data to be shared (e.g. a record is written in the security settings file (5.6) which can include one or more of: from user, to user, destination PC, data files, expiration date, maximum downloads, etc.) and sends email message (5.5.1) to PC (5.8), comprising at least a CPU, keyboard, display, storage, communication antenna, network card, non-volatile flash memory, Internet browser (5.8.2) and email client (5.8.3). Email (5.5.1) is received by PC (5.8) containing instructions regarding how to obtain data from remote storage device (5.4) and includes a link to specific data to be downloaded from remote storage device (5.4) to PC (5.8).

Upon receipt of the email, the user of PC (5.8) selects the link provided in email (5.5.1) establishing authentication request message (5.8.1) with remote computing device (5.5). The authentication request (5.8.1) contains a unique PC (5.8) serial number and a unique User ID and Password that are passed from the PC (5.8) to the remote computing device (5.5) using message (5.8.1). The remote computing device (5.5) receives the authentication request (5.8.1) from PC (5.8). The remote computing device (5.5) retrieves from the security settings file (5.6) the unique settings related to the User Id and password obtained in message (5.8.1) and further validates that the User Id and Password are presently valid and authorized for use with the PC serial number obtained from PC (5.8).

If the User Id and Password are determined to be valid for PC (5.8), data is transferred from remote storage device (5.4) onto PC (5.8) using message (5.4.1). Upon receipt of message (5.4.1) the downloaded data is stored on PC (5.8). Data is decrypted by remote computing device (5.5) prior to transmission using an encryption key that is uniquely related to the license key for software application (5.1.4). Remote computing device (5.5) sends internal message (5.5.2) containing details (which can include one or more of: file name, user name, destination PC, destination volume, and date transferred) of data transferred from remote storage device (5.4) to PC (5.8). Message (5.5.2) is stored as meta-data logs (5.3). It should be appreciated by those who are skilled in the art that a variety of methods of communication between the PCs, mobile devices, and the remote computing device (e.g. http, https, xml, ftp, etc.) may be used and the invention should not be construed as limited to any one set communication protocol or data format.

In other embodiments of the present invention as illustrated in FIG. 6, a PC (6.1) comprising at least a CPU, keyboard, display, storage, communication antenna, network card, non-volatile flash memory, software application (6.1.4) and database (6.1.5) executes software application (6.1.4) and requests the authentication of PC (6.1) with data contained in message (6.1.1). The authentication request (6.1.1) contains a unique PC serial number and a unique software license key that are passed from the PC (6.1) to remote computing device (6.5) using message (6.1.1). The remote computing device (6.5) receives the authentication request (6.1.1) from PC (6.1). The remote computing device (6.5) retrieves from the security settings file (6.6) unique security settings related to the PC (6.1) using the unique software (6.1.4) license key and validates that the license key is authorized for use with the PC (6.1).

If the software license key for software application (6.1.4) is valid for use with PC (6.1) data is transferred (e.g. uploaded) from PC (6.1) onto remote computing device (6.5) using message (6.1.2). Upon receipt of message (6.1.2) the remote computing device (6.5) stores transferred PC data into the remote storage device (6.4). Data is encrypted by software application (6.1.4) prior to upload and storage into remote storage device (6.4) using an encryption key that is uniquely related to the license key for software application (6.1.4). Software application (6.1.4) executed using the CPU of PC (6.1) stores details of data transferred from PC (6.1) to remote storage device (6.4) as meta-data logs on PC database (6.1.5). Software application (6.1.4) executed using the CPU and network resources of PC (6.1) sends message (6.1.3) containing details of data transferred from PC (6.1) to remote storage device (6.4). Message (6.1.3) is received by remote computing device (6.5) and stored as meta-data logs (6.3).

PC (6.1) then sends a data sharing request message (6.1.6) to remote computing device (6.5). Remote computing device (6.5) checks security settings (6.6) to determine if the data sharing request message is authorized for this user. If the data sharing request message is authorized, the remote computing device (6.5) updates security settings (6.6) to enable a security rule with the specific details regarding the data to be shared (e.g. a record is written in the security settings file (6.6) which can include one or more of: from user, to user, destination PC, data files, expiration date, maximum downloads, etc.) and sends email message (6.5.1) to mobile communication device (6.8), comprising at least a CPU, keyboard, display, communication antenna, non-volatile flash memory, Internet browser (6.8.2) and email client (6.8.3). The email (6.5.1) contains instructions regarding how to obtain data from remote storage device (6.4) and includes a link to specific data files to be downloaded from remote storage device (6.4) to mobile communication device (6.8).

Upon receipt of the email, the user of mobile communication device (6.8) selects the link provided in email (6.5.1) establishing authentication request message (6.8.1) with remote computing device (6.5). The authentication request (6.8.1) contains a unique mobile communication device serial number and a unique User ID and Password that are passed from the mobile communication device (6.8) to the remote computing device (6.5) using message (6.8.1). The remote computing device (6.5) receives the authentication request (6.8.1) from mobile communication device (6.8). The remote computing device (6.5) retrieves from the security settings file (6.6) the unique settings related to the User Id and Password obtained in message (6.8.1) and further validates that the User Id and Password are presently valid and authorized for use with the mobile communication device serial number obtained from mobile communication device (6.8).

If the User Id and Password are determined to be valid for mobile communication device (6.8), data is downloaded from remote storage device (6.4) onto mobile communication device (6.8) using message (6.4.1). Upon receipt of message (6.4.1) the downloaded data is stored on mobile communication device (6.8). Data is decrypted by the remote computing device (6.5) prior to transmission using an encryption key that is uniquely related to the license key for software application (6.1.4). Remote computing device (6.5) sends internal message (6.5.1) containing details of data transferred from remote storage device (6.4) to mobile communication device (6.8). Message (6.5.1) is stored as meta-data logs (6.3). It should be appreciated by those who are skilled in the art that a variety of methods of communication between the PCs, mobile devices and the remote computing device (e.g. http, https, xml, ftp, etc.) may be used and the invention should not be construed as limited to any one set communication protocol or data format.

In other embodiments of the present invention as illustrated in FIG. 7, a mobile communication device (7.1) comprising at least a CPU, keyboard, display, communication antenna, non-volatile flash memory, software application (7.1.4) and database (7.1.5) executes software application (7.1.4) and requests authentication of mobile communication device (7.1) using data contained in message (7.1.1). The authentication request (7.1.1) contains a unique mobile communication device (7.1) serial number and a unique software (7.1.4) license key that are passed from the mobile communication device (7.1) to remote computing device (7.5) using message (7.1.1). The remote computing device (7.5) receives the authentication request (7.1.1) from mobile communication device (7.1). The remote computing device (7.5) retrieves from the security settings file (7.6) unique security settings related to the mobile communication device (7.1) using the unique software (7.1.4) license key and validates that the license key is authorized for use with the mobile communication device.

If the software license key for software application (7.1.4) is valid for use with mobile communication device (7.1), data is transferred (e.g. uploaded) from mobile communication device (7.1) onto remote computing device (7.5) using message (7.1.2). Upon receipt of message (7.1.2) the remote computing device (7.5) stores transferred mobile communication device data into the remote storage device (7.4). Data is encrypted by software application (7.1.4) prior to upload and storage into remote storage device (7.4) using an encryption key that is uniquely related to the license key for software application (7.1.4). Software application (7.1.4) executed using the CPU of Mobile Communication Device (7.1) stores details of data transferred from Mobile Communication Device (7.1) to remote storage device (7.4) as meta-data logs on mobile device database (7.1.5). Software application (7.1.4) executed by the CPU of mobile communication device (7.1) sends message (7.1.3) containing details of data transferred from mobile communication device (7.1) to remote storage device (7.4). Message (7.1.3) is received by remote computing device (7.5) and stored as meta-data logs (7.3).

Mobile communication device (7.1) sends a data sharing request message (7.1.6) to remote computing device (7.5). Remote computing device (7.5) checks security settings (7.6) to determine if the data sharing request message is authorized for this user. If the data sharing request message is authorized, the remote computing device (7.5) updates security settings (7.6) to enable a security rule with the specific details regarding the data to be shared (e.g. from user, to user, destination device, data files, expiration date, maximum downloads, etc.) and sends text message (7.5.1) to mobile communication device (7.8). The text message (7.5.1) contains instructions regarding how to obtain data from remote storage device (7.4) and includes a link to specific data files to be downloaded from remote storage device (7.4) to mobile communication device (7.8), comprising at least a CPU, keyboard, display, communication antenna, non-volatile flash memory, and Internet browser (7.8.2).

Upon receipt of the text message, the user of mobile communication device (7.8) selects the link provided in text message (7.1.4) establishing authentication request message (7.8.1) with remote computing device (7.5). The authentication request (7.8.1) contains a unique User ID and Password that are passed from the mobile communication device (7.8) to the remote computing device (7.5) using message (7.8.1). The remote computing device (7.5) receives the authentication request (7.8.1) from mobile communication device (7.8). The remote computing device (7.5) retrieves from the security settings file (7.5) the unique settings related to the User Id and Password from mobile device (7.8) and further validates that the User Id and Password obtained in message (7.8.1) are presently valid and authorized for use with the mobile communication device serial number obtained from mobile communication device (7.8).

If the User Id and Password are determined to be valid for mobile communication device (7.8) data is transferred from remote storage device (7.4) onto mobile communication device (7.8) using message (7.4.1). Upon receipt of message (7.4.1) the downloaded data is stored on mobile communication device (7.8). Data is decrypted by remote computing device (7.5) prior to transmission using an encryption key that is uniquely related to the license key for software application (7.1.4). Remote computing device (7.5) sends internal message (7.5.2) containing details of data transferred from remote storage device (7.4) to mobile communication device (7.8). Message (7.5.2) is stored as meta-data logs (7.3). It should be appreciated by those who are skilled in the art that a variety of methods of communication between the PCs, mobile devices and the remote computing device (e.g. http, https, xml, ftp, etc.) may be used and the invention should not be construed as limited to any one set communication protocol or data format.

Although the exemplary embodiments herein are generally described in the context of software modules running on a computing device, those skilled in the art will recognize that the present invention also can be implemented in conjunction with other program modules in other types of computing environments. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description of the exemplary embodiments includes processes and symbolic representations of operations by conventional computer components, including processing units, memory storage devices, display devices and input devices. These processes and symbolic representations are the means used by those skilled in the art of computer programming and computer construction to most effectively convey teachings and discoveries to others skilled in the art. These processes and operations may utilize conventional computer components in a distributed computing environment, including remote file servers, remote computer servers, and remote memory storage devices. Each of these conventional distributed computing components is accessible by a processing unit via a communications network.

The present invention includes computer hardware and software which embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer hardware and software will be explained in more detail in the following description in conjunction with the other figures in the application.

Referring now to FIG. 8, aspects of an exemplary computing environment in which the present invention can operate are further illustrated. Those skilled in the art will appreciate that FIG. 8 and the associated discussion are intended to provide a brief, general description of the preferred computer hardware and program modules, and that additional information is readily available in the appropriate programming manuals, user's guides, and similar publications.

FIG. 8 illustrates a conventional computing device 120 suitable for supporting the operation of the preferred embodiment of the present invention as illustrated previously in FIGS. 1, 2, 3, 4, 5, 6, and 7 and referenced as the PCs (1.1, 2.1, 3.1, 4.1, 5.1, 6.1, 1.4, 2.4, 3.8, 4.8, 5.8) and remote computing devices (1.5, 2.5, 3.5, 4.5, 5.5, 6.5, 7.5). In FIG. 8, the computing device 120 operates in a networked environment with logical connections to one or more remote computers 111. The logical connections between computing device 120 and remote computer 111 are represented by a local area network 173 and a wide area network 152. Those of ordinary skill in the art will recognize that in this client/server configuration, the remote computer 111 may function as a remote computing device or remote storage device.

The computing device 120 includes a processing unit 121, such as "PENTIUM" microprocessors manufactured by Intel Corporation of Santa Clara, Calif. The computing device 120 also includes system memory 122, including read only memory (ROM) 124 and random access memory (RAM) 125, which is connected to the processor 121 by a system bus 123. The preferred computing device 120 utilizes a BIOS 126, which is stored in ROM 124. Those skilled in the art will recognize that the BIOS 126 is a set of basic routines that helps to transfer information between elements within the computing device 120. Those skilled in the art will also appreciate that the present invention may be implemented on computers having other architectures, such as computers that do not use a BIOS, and those that utilize other microprocessors.

Within the computing device 120, a local hard disk drive 127 is connected to the system bus 123 via a hard disk drive interface 132. A floppy disk drive 128, which is used to read or write a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134. A user enters commands and information into the computing device 120 by using input devices, such as a keyboard 140 and/or pointing device, such as a mouse 142, which are connected to the system bus 123 via a serial port interface 146. Other types of pointing devices (not shown in FIG. 8) include track pads, track balls, pens, head trackers, data gloves and other devices suitable for positioning a cursor on a computer monitor 147. The monitor 147 or other kind of display device is connected to the system bus 123 via a video adapter 148.

The remote computer 111 in this networked environment is connected to a remote memory storage device 150. This remote memory storage device 150 is typically a large capacity device such as a hard disk drive, CD-ROM or DVD drive, magneto-optical drive or the like. Those skilled in the art will understand that software modules are provided to the remote computer 111 via computer-readable media. The computing device 120 is connected to the remote computer by a network interface 153, which is used to communicate over the local area network 173.

In an alternative embodiment, the computing device 120 is also connected to the remote computer 111 by a modem 154, which is used to communicate over the wide area network 152, such as the Internet. The modem 154 is connected to the system bus 123 via the serial port interface 146. The modem 154 also can be connected to the public switched telephone network (PSTN) or community antenna television (CATV) network. Although illustrated in FIG. 8 as external to the computing device 120, those of ordinary skill in the art can recognize that the modem 154 may also be internal to the computing device 120, thus communicating directly via the system bus 123. Connection to the remote computer 111 via both the local area network 173 and the wide area network 152 is not required, but merely illustrates alternative methods of providing a communication path between the computing device 120 and the remote computer 111.

Although other internal components of the computing device 120 are not shown, those of ordinary skill in the art will appreciate that such components and the interconnection between them are well known. Accordingly, additional details concerning the internal construction of the computing device 120 need not be disclosed in connection with the present invention.

Those skilled in the art will understand that program modules, such as an operating system 135 and other software modules 160a, 163a and 166a, and data are provided to the computing device 120 via computer-readable media. In the preferred computing device, the computer-readable media include the local or remote memory storage devices, which may include the local hard disk drive 132, floppy disk 129, CD-ROM or DVD 131, RAM 125, ROM 124, and the remote memory storage device 150.

In other embodiments as illustrated in FIG. 9, an input device (9.1) is operable to add, change, or delete security settings stored within a remote storage device (9.6) comprised within a remote computing device (9.5). Security settings can include a list of authorized users, passwords, devices, and software license keys. A mobile device (9.8) is connected to a PC (9.2). A software application (9.8.2) (not shown) resident within the mobile device (9.8) is executed by the CPU of the PC (9.2). Using message (9.8.1) the software application requests data to be transferred to the PC (9.2) from the mobile device (9.8). The PC (9.2) sends the request message (9.2.1) to the remote computing device (9.5). The remote computing device approves or denies the request based on the security settings that are stored within the remote storage device (9.6). The approval or denial of the request is sent back to the software application executed by the first PC using message (9.6.1). If the request is approved, data is transferred from the mobile device (9.8) to the PC (9.2) using message (9.2.2) in accordance with the request. It should be appreciated by those who are skilled in the art that a variety of methods of communication between the mobile device and the PC, between the PC and the remote computing device, and between the input device and the remote computing device (e.g. http, https, xml, ftp, etc.) may be used and the invention should not be construed as limited to any one set communication protocol or data format. It should also be appreciated that the mobile device may comprise a simple storage device with no CPU or it may comprise a mobile communication device with at least a CPU operable for executing the software application.

In other embodiments as illustrated in FIG. 10, a mobile device (10.8) is connected to a PC (10.2). Using message (10.8.1) data is transferred from the mobile device (10.8) to the PC (10.2). Using message (10.2.2) data is transferred from PC (10.2) to the mobile device (10.8). A record of the data that is transferred between the mobile device (10.8) and the PC (10.2) is transferred using message (10.2.1) to a remote computing device (10.5) comprising a meta data log file (10.3). The remote computing device can be operable to store the received record into the meta data log file. Meta data stored can include file name, file type, originating PC, originating volume, destination PC, destination volume, user, and date. An input device (10.1) is operable to request information about the movement of data between the mobile device (10.8) and the PC (10.2). The remote computing device receives message (10.1.1) and processes the information request using data contained within the meta data log file. A report is produced by the remote computing device (10.5) based on the information request. The report is delivered to an output device (10.7) using message (10.3.1). It should be appreciated by those who are skilled in the art that a variety of methods of communication between the mobile device and the PC, between the PC and the remote computing device, between the input device and the remote computing device, and between the remote computing device and the output device (e.g. http, https, xml, ftp, etc.) may be used and the invention should not be construed as limited to any one set communication protocol or data format. It should also be appreciated that the mobile device may comprise a simple storage device with no CPU or it may comprise a mobile communication device with at least a CPU operable for executing the software application.

In other embodiments as previously disclosed in Provisional Patent Application 61/130,207 (to which the present application claims priority and incorporates by reference), the present invention relates to a method for accessing data stored on remote file servers using a software application stored on mobile devices such as USB flash drives, mobile phones, PDAs, BlackBerrys, and similar devices facilitating a multi-factor authentication method.

In recent years the numbers of USB flash drives and mobile devices with internal non-volatile flash memory have increased significantly. Conventional methods for accessing data stored on remote file servers are not effective for preventing unauthorized access. Most secure methods require a user id and password. Some methods also require a secure connection such as SSL or a VPN. These methods will not fully ensure that data cannot be accessed by an unauthorized person. Therefore, a need exists for a method that addresses these shortcomings in the prior art through the use of multi-factor authentication.

The present invention answers these needs by providing an apparatus and method for limiting access to data stored on a central file server or mass storage device, herein referred to as a remote storage device.

According to the present invention design, a software application resident on the non-volatile memory device (e.g. USB flash drive, mobile phone, PDA) is used to access the data stored on the remote storage device.

The user of the mobile device is required to enter a user name and password onto the device which is authenticated by the software application on the device.

The software application on the mobile device may be executed in two manners:
 (i) If the mobile device is connected to a local computer (either through a physical connection such as a USB or firewire or using a near field communication method such as blue tooth or RFID), the software application will utilize the CPU resources and network connections of the connected computer.
 (ii) If the mobile device is not connected to a local computer, the software application will utilize the CPU resources and network connections of the mobile device.

Files may be transferred (e.g. uploaded or downloaded) to or from the remote storage device only using the application on the mobile device.

Files may also be transferred directly to or from the remote storage device and to or from a designated authorized computer.

Alternatively, files may be transferred to or from the remote storage device and to or from the mobile device itself.

The movement of data may further be controlled by security rules resident on the non-volatile flash memory, mobile device and, or a remote storage device.

Embodiments of the present invention are described below by way of illustration. Other approaches to implementing the present invention and variations of the described embodiments may be constructed by a skilled practitioner and are considered within the scope of the present invention.

Referring now to FIG. 11, Mobile Device (11.2) with internal application serves as multi-factor authentication for remote data access. Mobile Device (11.2) may connect to Computer (11.1) using NFC or physical connection. Computer (11.1) transfers data files to and from a remote server using an internet or network connection and using the CPU resources of the computer.

Referring now to FIG. 12, Mobile Device (12.1) with internal application serves as multi-factor authentication for remote data access. Mobile Device (12.1) transfers data files to and from a remote server using an internet or network connection and using the CPU resources of the Mobile Device (12.1).

In other embodiments as previously disclosed in Provisional Patent Application 61/130,206 (to which the present application claims priority and incorporates by reference), the number of personal computers has increased significantly. Computers are used to store files and folders containing personal and business information such as music, pictures, spreadsheets, drawing, and other documents. Individuals and businesses often share data files by sending these files as attachments over the Internet. Current methods can protect data through automatic encryption; however, many individual users do not encrypt attachments prior to transmission. In addition, large files are often difficult to send as email attachments. There are no current methods which can serve to easily and securely share data stored on a sender's PC with a recipient's PC or Mobile device. Therefore, a need exists for a method that addresses these shortcomings in the prior art by easily and securely sharing data stored on PCs.

The present invention answers these needs by providing an apparatus and method for sharing data stored on a PC using a software application and a relational database stored on a central file server.

According to the present invention design, a secure database resident on the central file server is accessed by the sender's software application using the sender's encryption keys.

The sender authorizes the recipient to access selected files and folders that are stored in the sender's database.

The recipient initiates a transfer request to receive the selected files and folders. Subsequently, the selected files and folders are decrypted using the sender's encryption keys and encrypted using the recipient's encryption keys. The re-encrypted files are then stored in the recipient's database.

Files may be tagged with access rights granted by the original sender which will serve to govern the subsequent use and lifespan of the selected files and folders.

Embodiments of the present invention are described below by way of illustration.

Referring now to FIG. 13, a software agent on a Sender's PC uploads selected files and folders for digital sharing to a central file server. Files are stored in separate encrypted relational databases on the central file server which can comprise a Sender's database and a Recipient's database. Files are transferred from Sender's database to Recipient's database. Data is decrypted with sender's key and encrypted with recipient's key. A software agent on the Recipient's PC accesses selected files and folders from the relational database on the central file server.

Referring now to FIG. 14, a software agent on a Sender's PC uploads selected files and folders for digital sharing to a central file server. Files are stored in separate encrypted relational databases on the central file server which can comprise a Sender's database and a Recipient's database. Files are transferred from Sender's database to Recipient's database. Data is decrypted with sender's key and encrypted with recipient's key. A software agent on the Recipient's Mobile Device accesses selected files and folders from the relational database on the central file server.

As described in other embodiments as previously disclosed in Provisional Patent Application 61/130,189 (to which the present application claims priority and incorporates by reference), in recent years the number of mobile devices with internal non-volatile flash memory has increased significantly. These devices are routinely used for sending and receiving email and text messages. Devices are also increasingly used to store files and folders containing personal and business information such as music, pictures, spreadsheets, drawing, and other documents. There are no current methods which can serve to easily and securely share data stored on non-volatile flash memory contained within mobile devices with recipients using computers or other mobile devices.

Therefore, a need exists for a method that addresses these shortcomings in the prior art by easily and securely sharing data stored on mobile devices without the need for a computer to send or receive files.

The present invention answers these needs by providing an apparatus and method for sharing data stored on a nonvolatile memory device using a secure database resident on the flash memory and a software application on the mobile device. Embodiments of the present invention are described below by way of illustration.

FIG. 15 illustrates Secure Mobile Data Sharing comprising mobile devices with data storage. Mobile devices are shown as Mobile Device 1 (sender's device) and Mobile Device 2 (recipient's device). FIG. 15 also highlights a Recipient's PC.

According to the present invention design, a secure database resident on the non-volatile memory device provides a virtual container for storing and organizing selected data files stored on the device.

Emails, text messages or other file transfer methods (such as FTP) may be originated from the mobile device wherein data contained within the database (or data stored on the non-volatile flash memory outside of the database) may be attached to an email or text message. Or the data may be sent or received directly using a transmission method such as FTP.

Data may be attached either in a non-secured format (e.g. in the clear) or in a secured format (e.g. encrypted).
  (i) Secured data files are subsequently received and stored directly into a database on the recipient's computer or mobile device.
  (ii) Non-secured data files may be saved directly onto the recipient's computer or a mobile devices internal non-volatile flash memory.

In other embodiments as previously disclosed in Provisional Patent Application 61/130,223 (to which the present application claims priority and incorporates by reference), the present invention relates to a method for securing data stored on mobile devices such as USB flash drives, mobile phones, PDAs, BlackBerrys, and similar devices. In recent years the numbers of USB flash drives and mobile devices with internal non-volatile flash memory have increased significantly. Conventional methods for limiting access to confidential data stored on these devices are not effective. Furthermore, there are no current methods which can serve to control and log the movement of data to and from non-volatile flash memory contained within mobile devices and other portable storage devices.

Therefore, a need exists for a method that addresses these shortcomings in the prior art by securing data while stored on mobile devices and portable storage devices, through the logging of data as it moves on and off these devices, and by controlling the movement of this data.

The present invention answers these needs by providing an apparatus and method for limiting access to data stored on a nonvolatile memory device using software applications and a central security server.

According to the present invention design, a software application resident on the non-volatile memory device provides a secure "virtual vault-like container" for all data files stored on the device.

As files are transferred to the container and from the container, logs are created by the software application that provide a history of this movement of data. These logs are periodically uploaded and stored on a central security file server.

A software application may also be resident on the mobile device or PDA which will serve to provide immediate logging of the movement of data to and from the device.

Logs can be viewed by authorized users to monitor the movement of data to and from portable storage devices and mobile devices with non-volatile flash memory.

The movement of data may further be controlled by security rules resident on the non-volatile flash memory, mobile device and/or on the file server.

Embodiments of the present invention are described below by way of illustration.

Referring now to FIG. 16, a mobile device with data storage is depicted. Files are transferred to and from the mobile device from a first computer and a second computer. The mobile device logs and controls the movement of the data using an internet or wireless connection to a remote server.

Referring now to FIG. 17, a portable storage device with data storage is depicted. Files are transferred to and from the portable storage device from a first computer and a second computer. The first computer and the second computer log and control the movement of the data using an internet connection to a remote server. Those skilled in the art will recognize that the foregoing embodiments are merely illustrative and that the invention can be implemented with a variety of computing devices in a variety of different architectures. For example, the components of the remote computing device can be distributed among multiple computers in various locations. As another example, the sequence of steps described in connection with each of the foregoing embodiments are illustrative and certain steps can occur in other sequences in alternate embodiments of the invention. Other changes may be made to the foregoing embodiments without departing from the spirit and scope of the invention as defined in the claims.

I claim:

1. A computer-implemented method for remote data access using a user device, the computer-implemented method comprising:
   receiving, by a remote computer from the user device, an authentication request comprising a user device unique identifier and a mobile authentication device unique identifier, wherein the mobile authentication device unique identifier is provided to the user device from a mobile authentication device, and wherein the mobile authentication device and the user device are associated with a software license stored on the remote computer;
   determining, by the remote computer, that the user device is authorized for use with the software license by determining that the user device unique identifier is valid in combination with the software license stored on the remote computer;
   upon determining, by the remote computer, that the user device is authorized for use with the software license, transmitting, by the remote computer to the user device, a validation message associated with the user device; and
   responsive to transmitting the validation message, transmitting, by the remote computer, data to the user device.

2. The computer-implemented method of claim 1, wherein a user identifier and a user password are authenticated by a mobile software application executing on the mobile authentication device; and wherein the mobile software application executing on the mobile authentication device is associated with the software license stored on the remote computer.

3. The computer-implemented method of claim 1, wherein the transmitting of the data to the user device is controlled by a mobile software application resident on the mobile authentication device, and wherein the mobile software application stored on the mobile authentication device is associated with the software license stored on the remote computer.

4. The computer-implemented method of claim 2, wherein the mobile authentication device is in communication with the user device using a wireless communication method.

5. The computer-implemented method of claim 3, wherein the mobile authentication device logs and controls movement of the data transmitted from the remote computer to the user device using an internet or wireless connection to the remote computer.

6. The computer implemented method of claim 1, wherein a meta-data log with a corresponding record of details of the data, which was transmitted from the remote computer to the user device, is stored on the mobile authentication device.

7. A computer-implemented method for remote data access using a user device, the computer-implemented method comprising:
   receiving, by a remote computer from the user device, an authentication request comprising a user device unique identifier wherein the user device unique identifier is associated with a software license stored on the remote computer;
   determining, by the remote computer using the user device unique identifier, that the user device is valid in combination with the software license stored on the remote computer;
   upon determining, by the remote computer, that the user device is valid in combination with the software license, transmitting, by the remote computer, a first validation message associated with the user device to a mobile authentication device associated with the software license stored on the remote computer;
   responsive to transmitting the first validation message, transmitting, by the remote computer to the user device, a second validation message associated with the user device; and
   responsive to transmitting the first validation message and the second validation message, transmitting, by the remote computer, data to the user device.

8. The computer-implemented method of claim 7, wherein the user device unique identifier comprises a unique serial number.

9. The computer-implemented method of claim 7, wherein the mobile authentication device further comprises a processor, a non-volatile flash memory, and a wireless antenna for communicating with the remote computer.

10. The computer-implemented method of claim 7, wherein the user device is in communication with the remote computer via a connection to a television network.

11. The computer-implemented method of claim 7, wherein responsive to the first validation message, a user identifier and user password are authenticated by a mobile software application executing on the mobile authentication device; and wherein the mobile software application executing on the mobile authentication device is associated with the software license stored on the remote computer.

* * * * *